US008128065B2

(12) United States Patent
King et al.

(10) Patent No.: US 8,128,065 B2
(45) Date of Patent: Mar. 6, 2012

(54) LIFTING ASSIST DEVICE

(75) Inventors: Emily Catherine King, Victoria (CA); Adam Mathew Sobchak, Toronto (CA); Gerald Thomas Griggs, Scarborough (CA); Geoffrey Roy Fernie, Etobicoke (CA); Philip Joseph Wilcox, North York (CA); Tilak Dutta, Sudbury (CA)

(73) Assignee: Toronto Rehabilitation Institute, Toronto, Ontario (CA)

( * ) Notice: Subject to any disclaimer, the term of this patent is extended or adjusted under 35 U.S.C. 154(b) by 845 days.

(21) Appl. No.: 12/149,845

(22) Filed: May 8, 2008

(65) Prior Publication Data

US 2009/0045383 A1 Feb. 19, 2009

Related U.S. Application Data

(60) Provisional application No. 60/924,318, filed on May 9, 2007.

(51) Int. Cl.
*B60P 1/48* (2006.01)

(52) U.S. Cl. .................. 254/93 HP; 254/228; 254/277; 5/614; 5/615

(58) Field of Classification Search ............. 254/9.3 HP, 254/228, 277; 5/81.1, 81.3, 655.3 R
See application file for complete search history.

(56) References Cited

U.S. PATENT DOCUMENTS 3,026,541 A * 3/1962 Murat .............................. 5/83.1
3,178,732 A * 4/1965 Stibitz .............................. 5/83.1

FOREIGN PATENT DOCUMENTS

CA 1044217 12/1978
CA 1078812 6/1980
CA 2381855 10/2002
CA 2504763 5/2004
CA 2565345 11/2005
CA 2506131 6/2006

OTHER PUBLICATIONS

International Search Report for PCT/CA2008/000929, dated Aug. 15, 2008.
Written Opinion for PCT/CA2008/000929 dated Aug. 15, 2008.

* cited by examiner

*Primary Examiner* — Joseph J Hail
*Assistant Examiner* — Shantese McDonald

(57) ABSTRACT

Disclosed herein is a device for lifting an article comprising a housing having an inner chamber, the housing having a leading edge region in fluid communication with the inner chamber, the leading edge region being arranged to engage an access region between an article and a support surface beneath the article, an elongate tubular member having a first open end region and a second closed end region, the first open end region being directly or indirectly in fluid tight relation with the leading edge region, the elongate tubular member having a first surface in fluid communication with the inner chamber and an opposite second surface, the housing being arranged to provide a retracted position in which the elongate tubular member is held relative to the leading edge region and responsive to an operative pressure within the inner chamber to unfurl beyond the leading edge region to cause the elongate tubular member to migrate along the access region with the second surface in contact with the article and the support surface and with minimal relative motion between the contacting surfaces of the elongate tubular member, the article and the support surface and toward a deployed position in which the tubular member extends a distance exceeding a lateral dimension of the article with opposed ends of the tubular member being available to be employed for lifting the article from the support surface.

2 Claims, 24 Drawing Sheets

LIFTING ASSIST DEVICE

REFERENCE TO COPENDING APPLICATIONS

The entire subject matter of U.S. Provisional application 60/924,318 filed May 9, 2007 and entitled LIFTING ASSIST DEVICE is incorporated herein by reference. The applicants claim priority benefit under Title 35, United States Code, Section 119 of the above application.

FIELD OF THE INVENTION

The present invention relates to devices and methods for transferring patients or other objects.

DESCRIPTION OF THE RELATED ART

Caregiving personnel are known to have higher rates of musculoskeletal injury than workers in other occupations traditionally considered hazardous, such as mining, construction and manufacturing. Back injury is a common overexertion complaint by caregivers primarily occurring during patient transfer tasks such as lifting, transferring, and repositioning (i.e. moving a patient from a bed to a wheelchair, adjusting the patient in bed).

The occurrence of transfer task-related musculoskeletal injuries is exacerbated by the increase in the prevalence of obesity in Canada. Since 1985 there has reportedly been a 225% increase in the most severe level of obesity, and this increase is consistent with trends in the US.

Patient lift devices are currently in use, such as that described in U.S. Pat. No. 6,938,285 issued to Fernie et al. entitled PATIENT TRANSFER DEVICE. While devices such as this do partially reduce the loading experienced by the caregiver, some examples of such lift devices require the use of a sling which must be placed under the subject before they can be lifted. Research suggests that over half of the time spent in a lifting task is related to applying and removing a sling or strap arrangement beneath a patient. A survey of nursing homes, hospitals and home care agencies, published in 2006, found that positioning of the sling under a patient was reported as the most physically demanding part of using any type of mechanical lift device.

It would be desirable to provide a novel approach to this task.

BRIEF DESCRIPTION OF THE DRAWINGS

Several preferred embodiments of the present invention will be provided, by way of examples only, with reference to the appended drawings, wherein.

DESCRIPTION OF THE PREFERRED EMBODIMENTS

Figure 1:
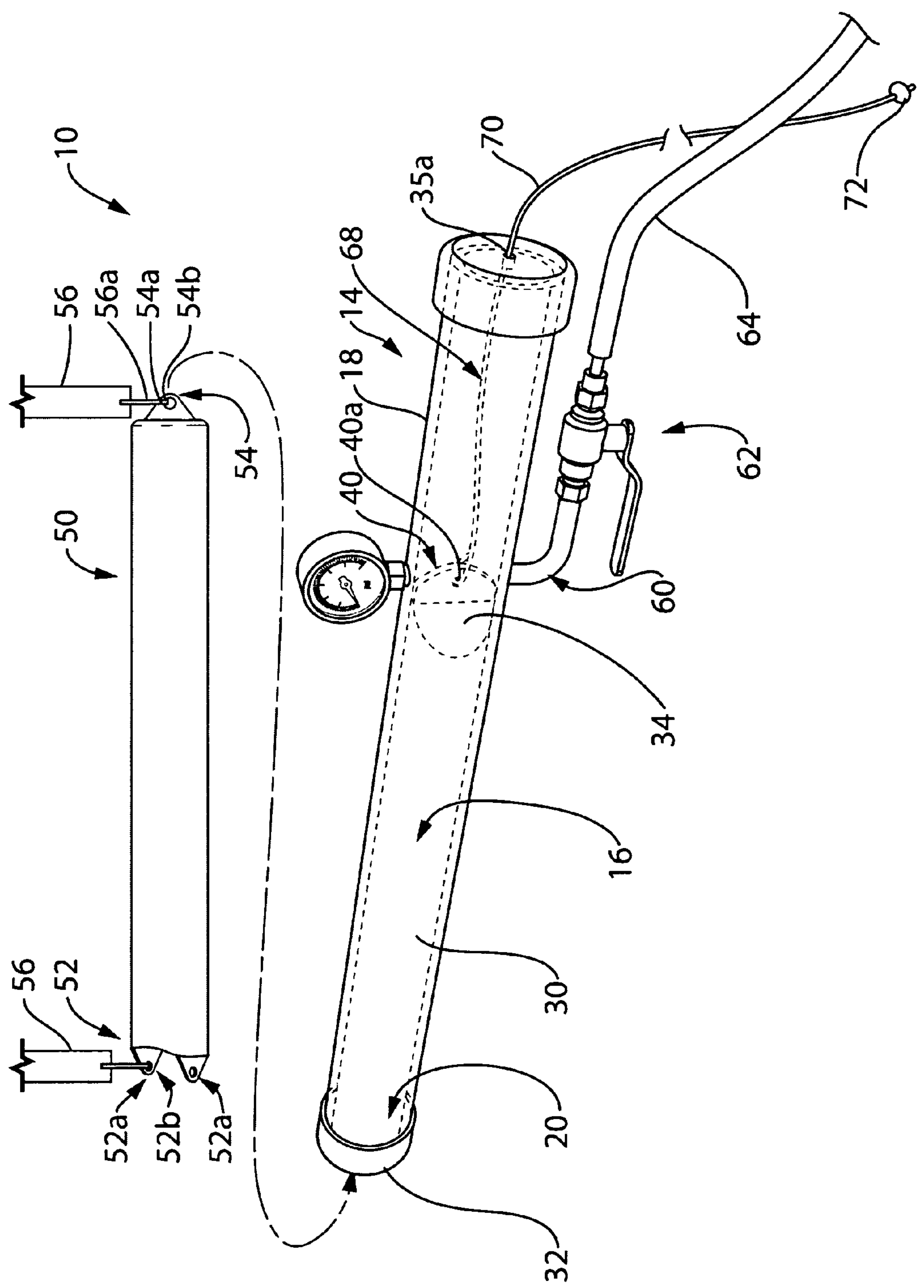
FIG. 1 is a perspective assembly view of a device for lifting an object, such as a patient.

As is discussed in more detail below, in one embodiment, there is provided a device for lifting a patient, comprising an elongate barrel having an inner surface forming a chamber. The elongate barrel has a first length and a leading edge region, the leading edge region being arranged to penetrate, or otherwise engage or be directed to, an access region between the patient and a support surface. A sock member has a first open end region and a second closed end region. The open end region is coupled in fluid tight relation with the leading edge region. The sock member has a first surface in fluid communication with the inner surface to seal the chamber and an opposite second surface. The sock member is arranged to extend between a first retracted position along a second length of the inner surface and a second deployed position beyond the barrel. A fluid inlet port is provided to deliver pressurized fluid to the chamber, the sock member being operable under an operative pressure within the chamber to unfurl beyond the leading edge region and to progress along the access region. The sock member is operable to travel between the first retracted position and the second deployed position beyond the elongate barrel and with the first open end region and the second closed end region on opposite sides of the patient.

The first open end region of the sock member may be permanently or removably attached to the leading edge region of the elongate barrel, as desired.

In some embodiments, the elongate barrel has a boundary wall opposite the leading edge region, further comprising a tension member operable to extend between the second closed end region of the sock member and the boundary wall. The boundary wall may be provided with a passage therethrough to receive the tension member. The tension member may be removably attachable to the second coupling portion. The tension member may also have a free end region to extend beyond the boundary wall, the free end region including a handle formation. The tension member may have a length sufficient to extend from the boundary wall through the inner chamber to the second coupling portion when the sock member is in the second deployed position. The fluid inlet port may, if desired, be located adjacent the boundary wall, with a fitting for engaging an air hose therewith, though other configurations are contemplated as are discussed below.

The sock member may, in one example, be operable to progress along the access region when the chamber is pressurized at a range of 3 to 10 psi, or alternatively at a pressure not exceeding 4 psi, though other pressure ranges and operating pressures may be used as desired.

As is illustrated below, some embodiments further comprise a lifting sleeve member having a third open end region and fourth closed end region, the third open end region being arranged to engage the leading edge region of the elongate barrel and/or the first open end region of the sock member. The lifting sleeve member is dimensioned for the fourth closed end region to be near the second closed end region of the sock member and adjacent the second surface of the sock member when the sock member is in the first retracted position. In this case, the third and fourth end regions of the lifting sleeve member may further include third and fourth coupling portions respectively for coupling with a lifting device.

As is illustrated below, in some embodiments, the lifting sleeve member may be arranged to be inside the sock member in the retracted position, the sock member being arranged to be inside the sock member in the second deployed position. Further, the sock member may be retractable from within the lifting sleeve member after the sock member has reached the second deployed position.

In an alternative embodiment, there is provided a device for lifting an article comprising a housing having an inner chamber, the housing having a leading edge region in fluid communication with the inner chamber, the leading edge region being arranged to engage an access region between an article and a support surface beneath the article, an elongate tubular member having a first open end region and a second closed end region, the first open end region being directly or indirectly in fluid tight relation with the leading edge region, the elongate tubular member having a first surface in fluid communication with the inner chamber and an opposite second surface, the housing being arranged to provide a retracted position in which the elongate tubular member is held relative to the leading edge region and responsive to an operative pressure within the inner chamber to unfurl beyond the leading edge region to cause the elongate tubular member to migrate along the access region with the second surface in contact with the article and the support surface and with minimal relative motion between the contacting surfaces of the elongate tubular member, the article and the support surface and toward a deployed position in which the tubular member extends a distance exceeding a lateral dimension of the article with opposed ends of the tubular member being available to be employed for lifting the article from the support surface.

In some embodiments, the housing includes a back wall portion and a side wall portion, the side wall portion defining the leading edge region. A coupling ring portion engages the side wall portion at the leading edge region. The leading edge region includes an outer surface, the coupling ring portion having an outer section to engage the outer surface. The leading edge region may also include an inner surface and the coupling ring portion may include an inner section to engage the inner surface. The first open end region of the elongate tubular member may be arranged to be located between the leading edge region and the coupling ring portion.

In some embodiments, the elongate tubular member may be pinched and/or otherwise held between the leading edge region and the coupling ring portion. If desired, the elongate tubular member may be attached to the coupling ring portion.

In some embodiments, one or more locking portions may be anchored to the coupling ring portion and/or the housing for locking the coupling ring portion relative to the leading edge region. The housing may include an anchor ridge adjacent the coupling ring portion, with the one or more locking portions including opposed locking tabs mounted on the coupling ring portion to engage the anchor ridge. As an alternative, the one or more locking portions may be mounted on the housing at a location remote from the leading edge region. Each locking portion includes a finger extending from an anchor location adjacent the back wall and extending along the side wall portion toward the leading edge region. A release member may be slidably engaged with the housing and movable toward a release position in which the release member engages the locking portions to release the coupling ring portion.

In some embodiments, the elongate tubular member may be operable to assume a nested configuration within the inner chamber to form a nested body.

In some embodiments, the back wall portion includes a passage to receive a supply of pressurized fluid therethrough to inflate the elongate tubular member. Further, the back wall portion may include a plurality of projections to space the elongate tubular member away from the back wall portion.

In some embodiments, the nested body and the inner chamber being arranged to form at least one channel to deliver the pressurized fluid from the passage to an annular region around the nested body adjacent the coupling ring portion. The nested body may be configured for the elongate tubular member adjacent to the coupling portion to progressively unfurl from the nested body. The nested body may have an outer boundary of a predetermined first lateral dimension, the inner chamber having a pair of opposed inner faces spaced by a predetermined second lateral dimension, the first lateral dimension being smaller than the second lateral dimension to form a gap between the nested body and the opposed inner faces to permit the pressurized fluid to be delivered from the passage to a region adjacent the leading edge region, the nested body being further configured to permit the elongate tubular member to begin to expand from the nested body from a location adjacent the leading edge region. The inner chamber may have a pair of opposed inner faces the nested body being dimensioned smaller than the inner chamber to form a gap therebetween to permit the pressurized fluid to be delivered from the passage to a region adjacent the leading edge region for unfurling the elongate tubular member from the nested body.

In some embodiments, the device may include comprise an external pressurized fluid fitting located on the back wall portion and in fluid communication with the passage. A pressurized fluid supply may be provided for coupling with the external pressurized fluid fitting, and a control portion for controlling delivery of pressurized fluid thereto. The pressurized fluid supply may, in one example, include a pressurized fluid tank with an outlet valve, a fluid hose having a first end portion coupled to the outlet valve, the fluid hose having a second end portion, the control portion including a control valve coupled to the second end portion and complementary with the pressurized fluid fitting.

In some embodiments, the back wall portion may include a plurality of outer support posts symmetrically arranged in spaced relation relative to the pressurized fluid fitting. The outer support posts may be located to fit within a leading edge region of a housing from a neighbouring device to form a stack of devices.

In some embodiments, the elongate tubular member includes a first strap portion on one side of the second closed end region and interior to the elongate tubular member in the nested configuration and a second strap portion on an opposite side of the second closed end region and exterior of the elongate tubular member in the nested configuration.

An alternative embodiment provides an article lift kit including a plurality of devices as defined, each with a fitting for deploying the elongate tubular member, a pressurized fluid supply complementary with each of the fittings, the article lift kit operable for deploying each of a plurality of the devices at corresponding locations along the article, and a control portion for controlling delivery of pressurized fluid at the operative pressure to each corresponding fitting.

In another embodiment, there is provided a device for lifting a patient comprising a housing having an inner chamber, the housing having a leading edge region in fluid communication with the inner chamber, the leading edge region being arranged to penetrate an access region between a patient and a support surface beneath the patient, an elongate tubular member having a first open end region and a second closed end region, the open end region being in fluid tight relation with the leading edge region, the elongate tubular member having a first surface in fluid communication with the chamber and an opposite second surface, the housing being arranged to provide a retracted position in which the elongate tubular member is held relative to the leading edge region and responsive to an operative pressure within the chamber to unfurl beyond the leading edge region to cause the elongate tubular member to migrate along the access region with the second surface in contact with the patient and the support surface and with minimal relative motion between the contacting surfaces of the elongate tubular member, the patient and the support surface and toward a deployed position in which the tubular member extends a distance exceeding a lateral dimension of the patient with opposed ends of the tubular member being available to be employed for lifting the patient from the support surface.

In yet another embodiment, there is provided a device for lifting an article comprising a housing having an inner chamber, the housing having a leading edge region in fluid communication with the inner chamber, the leading edge region being arranged to penetrate an access region between an article and a support surface beneath the article, an elongate tubular member having a first open end region and a second closed end region, the open end region being in fluid tight relation with the leading edge region, the elongate tubular member having a first surface in fluid communication with the chamber and an opposite second surface, the housing being arranged to provide a retracted position in which the elongate tubular member is held relative to the leading edge region and responsive to an operative pressure within the chamber to unfurl beyond the leading edge region to cause the elongate tubular member to migrate along the access region with the second surface in contact with the article and the support surface and with minimal relative motion between the contacting surfaces of the elongate tubular member, the article and the support surface and toward a deployed position in which the tubular member extends a distance exceeding a lateral dimension of the article with opposed ends of the tubular member being available to be employed for lifting the article from the support surface.

In an alternative embodiment, there is provided a method for lifting a patient, in which a recoiled elongate sleeve member is provided and held in a first retracted position in a pressurized support. The method thus involves pressurizing the sleeve member in a manner to cause it to unfurl from the first retracted position on one side of a patient, along an intersection between the patient and an adjacent support surface to a second extended position on an opposite side of the patient, releasing the sleeve member from the pressurized support, coupling exposed end regions of the sleeve member to a lifting device, and displacing the lifting device to lift the sleeve member.

In some embodiments, the pressurized support includes a housing having a side wall defining an inner chamber and a leading edge region in fluid communication with the inner chamber, the sleeve member having a first open end region and a second closed end region. In this case, the method may include securing the first open end region directly or indirectly in fluid tight relation with the leading edge region so that an interior of the sleeve member is in fluid communication with the inner chamber, the step of pressuring the sleeve member including the step of pressuring the inner chamber.

In some embodiments, the method may include installing or engaging a coupling ring portion with the side wall portion near the leading edge region. The method may include locating the first open end region of the sleeve member between the leading edge region and the coupling ring portion. The method may further include pinching and/or otherwise holding the sleeve member between the leading edge region and the coupling ring portion. Still further, the method may further comprise attaching the sleeve member to the coupling ring portion. The method may further comprise removably locking the coupling ring portion with the side wall portion.

In some embodiments, the method may further comprise arranging the sleeve member in its first retracted position to form a nested body, and arranging the nested body and the inner chamber to form at least one channel for pressurized fluid from the inner chamber to be directed to a region adjacent the nested body near the coupling ring portion to deploy a leading segment of the sleeve member from the nested body.

Still further embodiments may comprise providing a first strap portion on one side of the second closed end region and interior to the sleeve member in a fully deployed configuration and a second strap portion on an opposite side of the second closed end region and exterior of the sleeve member in the fully deployed configuration.

Still further embodiments may comprise coupling a pressurized fluid supply with the inner chamber.

In yet another embodiment, there is provided a device for lifting an article comprising a housing having an inner chamber, the housing having a leading edge region in fluid communication with the inner chamber, the leading edge region being arranged to engage an access region between an article and a support surface beneath the article, at least one primary elongate tubular member having a first open end region and a second closed end region, the first open end region being directly or indirectly in fluid tight relation with the leading edge region, at least one secondary elongate tubular member in fluid communication with the primary elongate tubular member and extending outwardly therefrom, the primary and second elongate tubular members having a first surface in fluid communication with the inner chamber and an opposite second surface, the housing being arranged to provide a retracted position in which the primary and secondary elongate tubular members are held relative to the leading edge region and responsive to an operative pressure within the inner chamber to unfurl beyond the leading edge region to cause the primary and secondary elongate tubular members to migrate along the access region with the second surface in contact with the article and the support surface and with minimal relative motion between the contacting surfaces of the primary and secondary elongate tubular members, the article and the support surface and toward a deployed position in which the primary and/or secondary tubular members extend a distance exceeding a lateral dimension of the article with opposed ends of the primary and/or secondary tubular members being available to be employed for lifting the article from the support surface.

Some embodiments may include a plurality of primary or secondary elongate tubular members, two or more of the elongate tubular members being coupled together. Further, some embodiments may include two or more elongate tubular members having a distal end region, the elongate tubular members being coupled at or near the distal end region.

In still another embodiment, there is provided a method of lifting a patient, comprising:

providing an elongate barrel with an inner surface forming a chamber, a first length and a leading edge region, arranging the leading edge region to penetrate an access region between the patient and a support surface, providing a sock member with a first open end region and a second closed end region, and coupled in fluid tight relation with the leading edge region, the sock member having a first surface in fluid communication with the inner surface to seal the chamber and an opposite second surface, pressurizing the chamber to unfurl the sock beyond the leading edge region and to progress along the access region, the sock member being operable to travel between the first retracted position and a second deployed position beyond the elongate barrel and with the first open end region and the second closed end region on opposite sides of the patient.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention. However, other alternative mechanical configurations are possible which are considered to be within the teachings of the instant disclosure. Furthermore, unless otherwise indicated, the term "or" is to be considered inclusive.

Figure 4A:
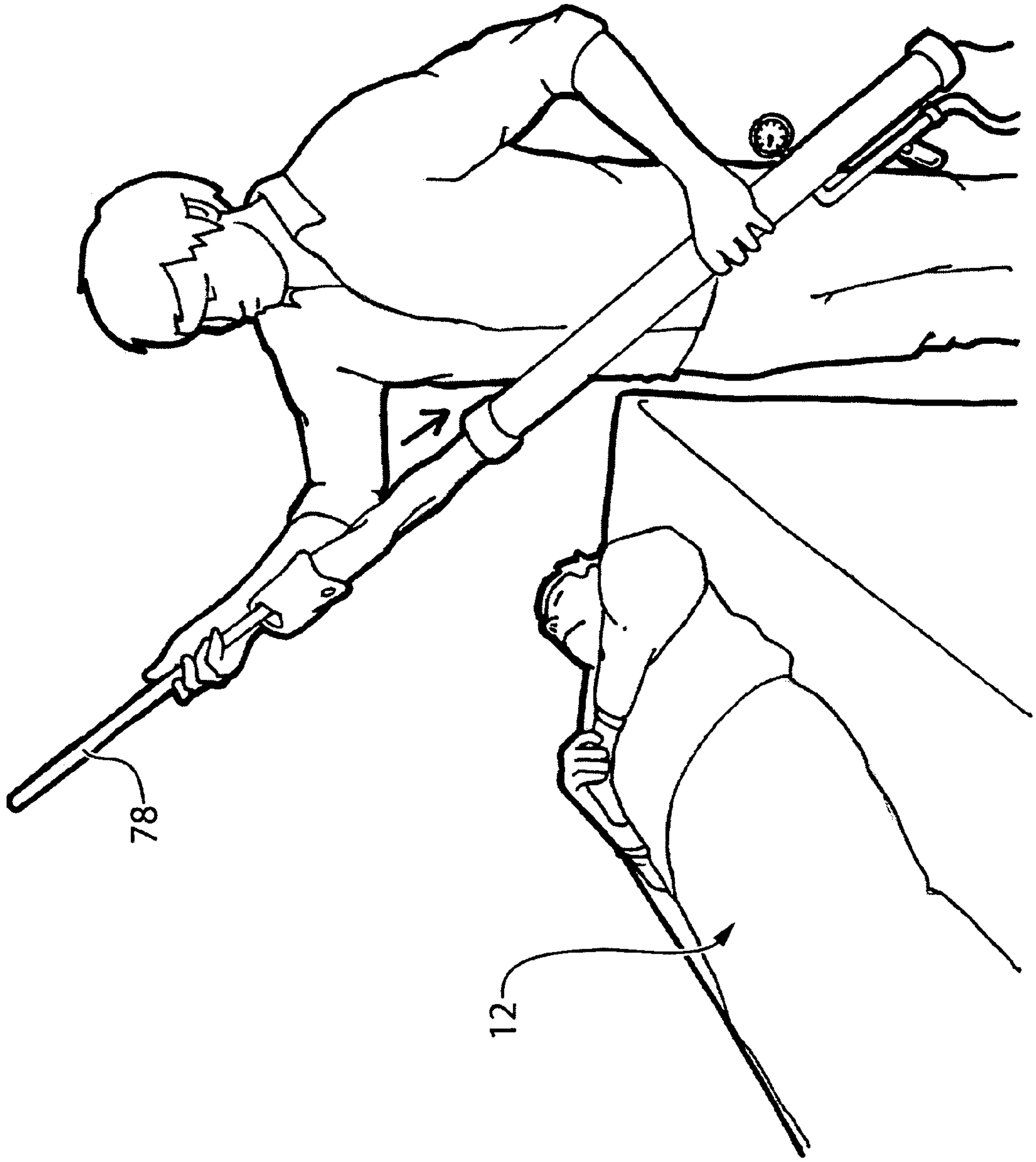
FIGS. 4*a* to 4*e* are schematic perspective views of a lifting operation involving the device of FIG. 1.
Figure 4B:
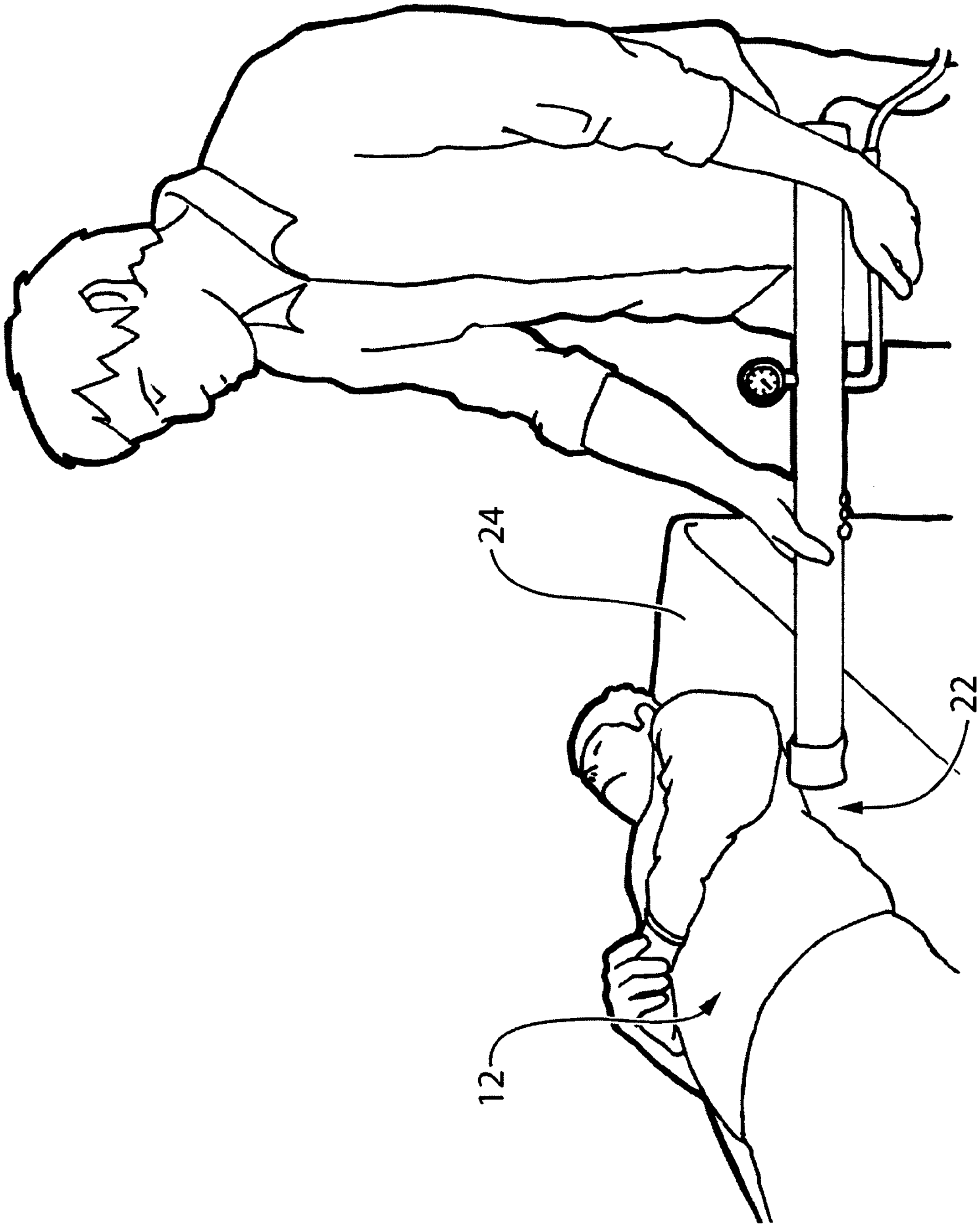
Figure 4C:
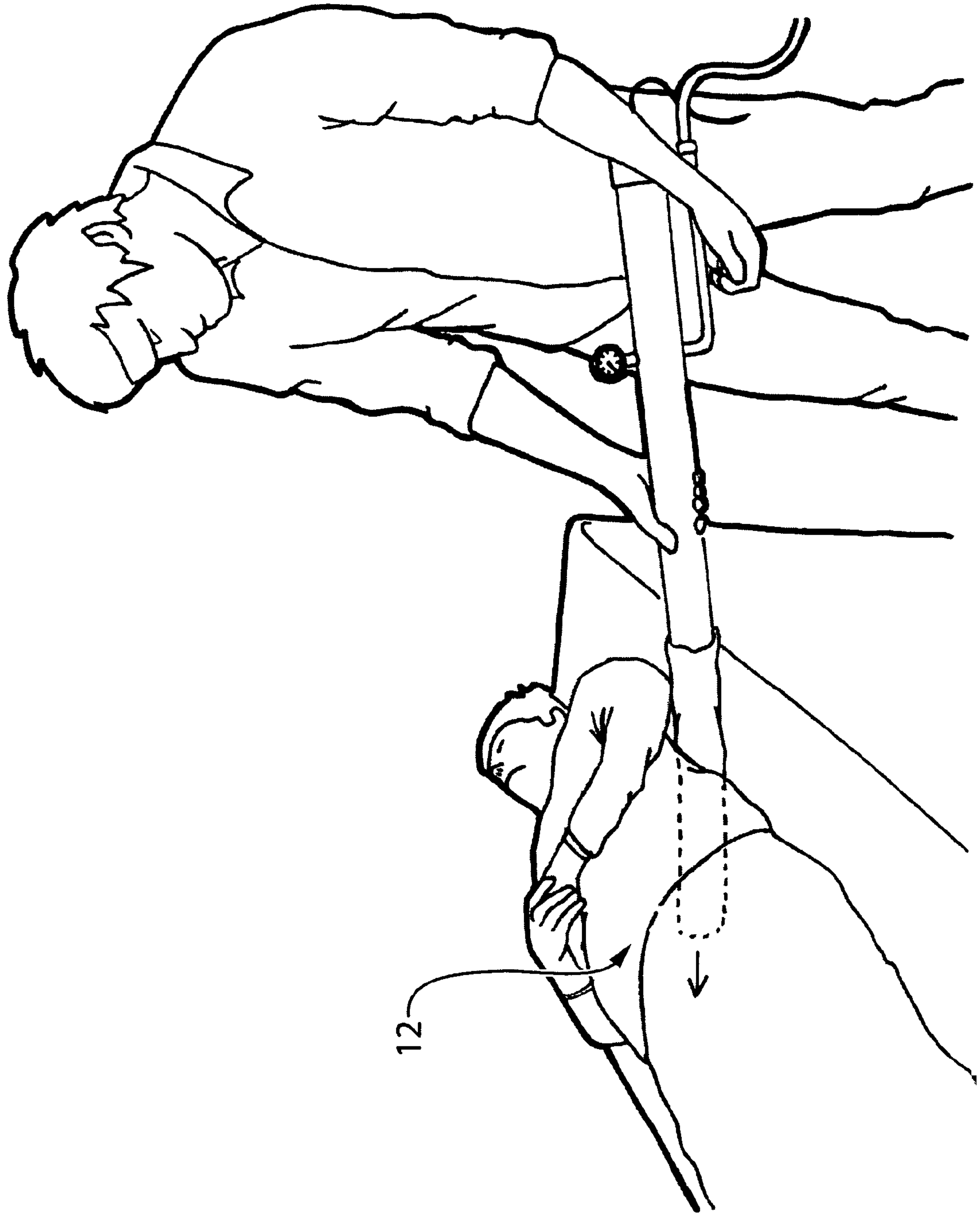
Figure 4D:
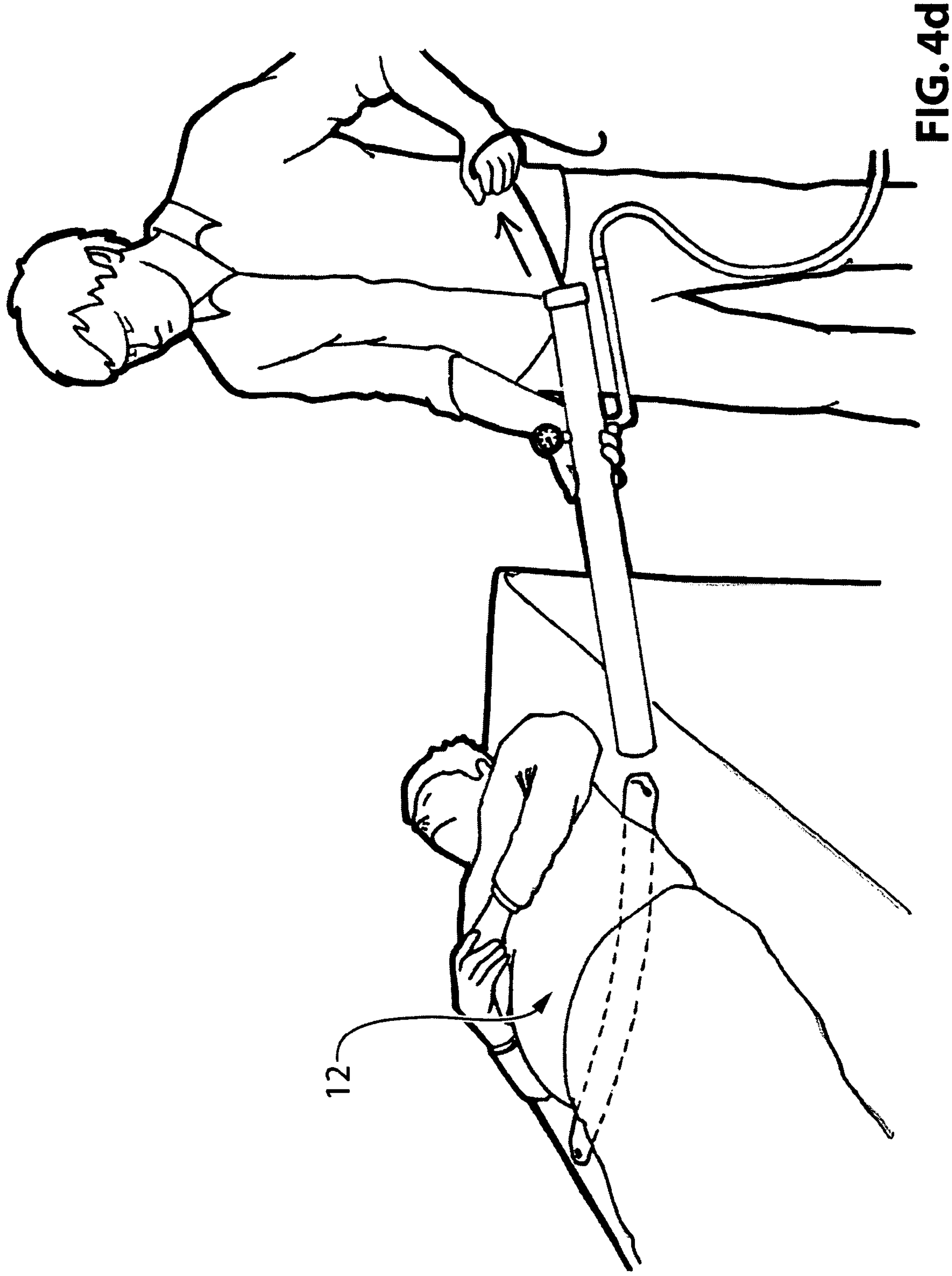
Figure 4E:
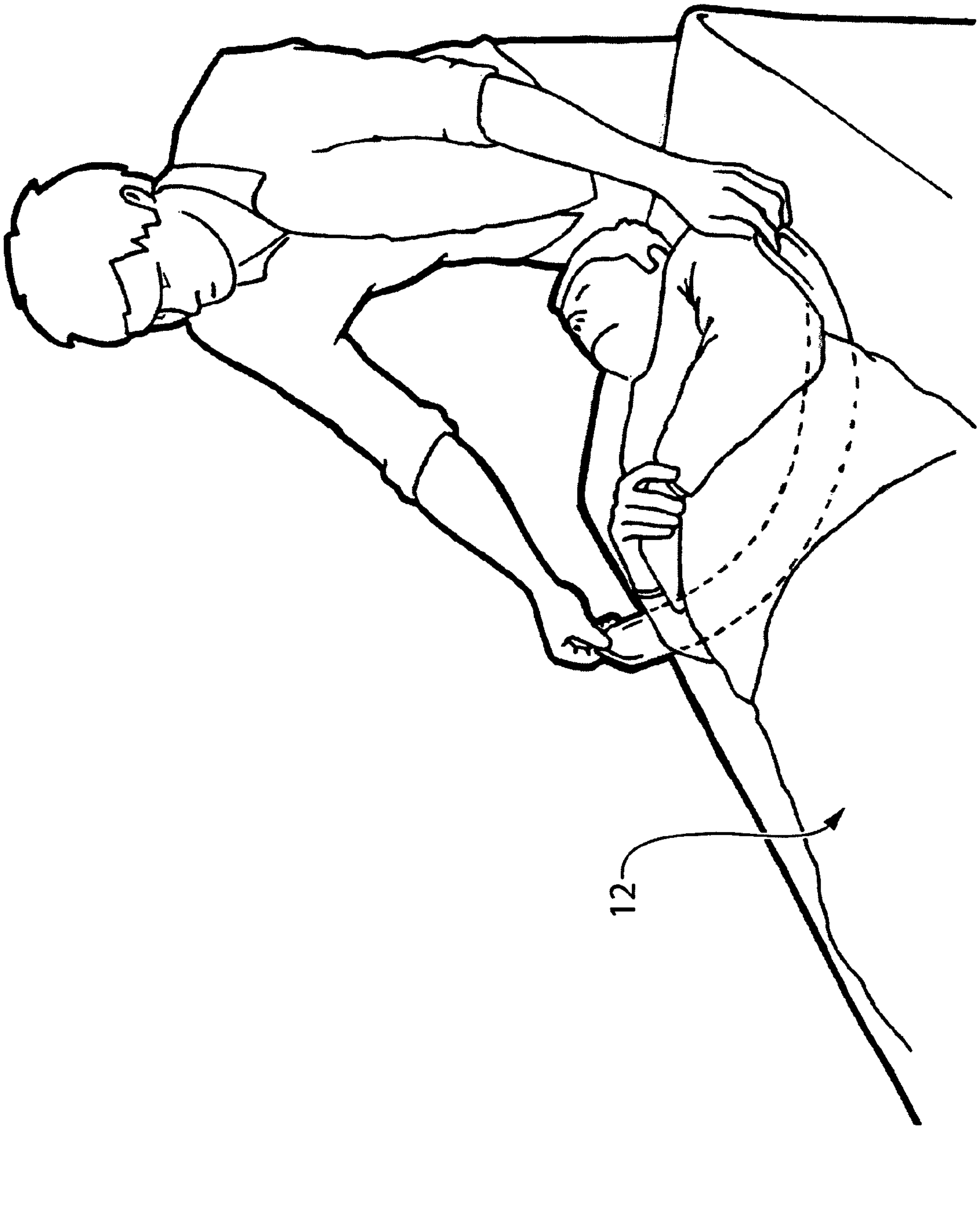

Referring to the figures, there is provided a device 10 for lifting a patient 12. The device 10 has a housing 14 with an inner chamber 16. In this case, the housing 14 is provided in the form of an elongate barrel 18 with a leading edge region 20 and a closed end 21 (FIG. 2) provided by a boundary wall 35. The barrel 18, in this case, is a relatively rigid unitary structure which may be formed from such metal and/or polymeric materials or the like, though the barrel may also be of other configurations, such as a unshaped or coiled configuration. It may be formed of multiple components and/or expandable. It may also be formed from other non-rigid configurations in some cases. Referring to FIG. 4*b*, the leading edge region 20 is arranged to penetrate, engage or otherwise be directed at an access region 22 between a patient 12 and a support surface 24 beneath the patient 12.

Figure 2:
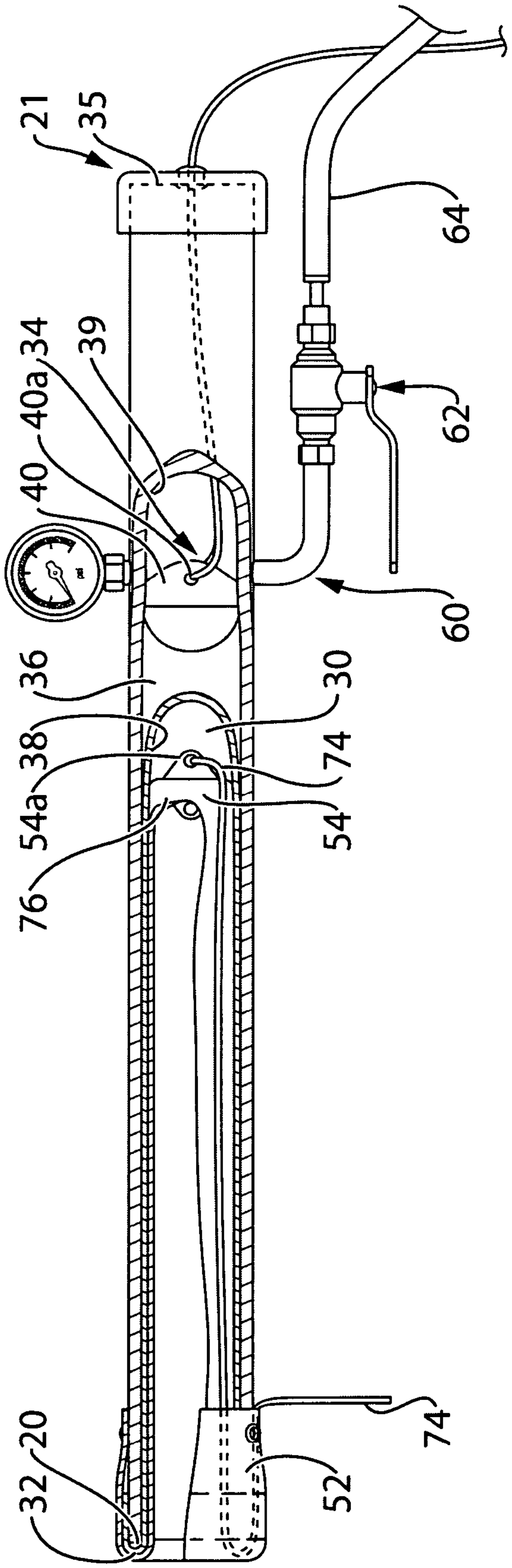
FIG. 2 is a side view of the device of FIG. 1.

Referring to FIGS. 1 and 2, an elongate tubular member 30, in this case in the form of an elongate bladder or sock member, is provided in the housing 14 with a first open end region 32 and a second closed end region 34, with a second coupling portion 40 including an eyelet 40*a*. The open end region 32 is in fluid tight relation with the leading edge region 20 of the elongate barrel 18.

The sock member 30 is formed from a substantially airtight material such as a fibre reinforced synthetic rubber, vinyl or the like or a material capable of retaining a working fluid at an operative pressure for sufficient time to allow the sock member to operate in the manner to be described. The sock member 30 has a first surface 36 which is in fluid communication with the chamber 16 and an opposite second surface 38. In the arrangement shown in FIG. 2, the first surface 36 is in direct contact with an inner wall 39 of the elongate barrel 18. The elongate barrel 18 is arranged to provide a retracted position for the sock member 30 as shown in FIG. 2. In this position, the sock member 30 is held within the elongate barrel 18 relative to the leading edge region 20.

Figure 3:
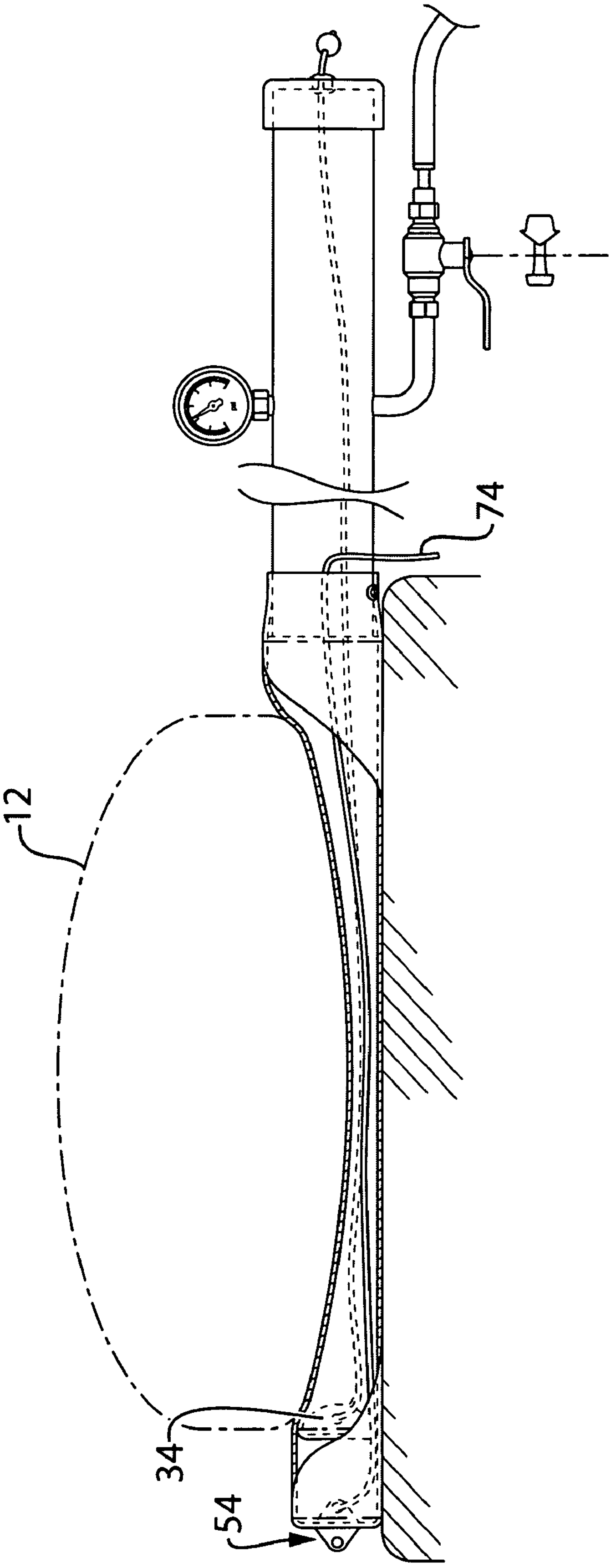
FIG. 3 is a side view of the device of FIG. 1 in another configuration.

As will be described, the sock member 30 is responsive to an operative pressure within the chamber 16 to unfurl beyond the leading edge region 20 to cause the sock member 30 to migrate along the access region 22 with minimal relative movement between the operative surfaces of the sock member 30, the patient 12 and the support surface 24 and toward a deployed position as shown in FIG. 3. In the deployed position, the sock member 30 extends a distance exceeding a lateral dimension (i.e. the width) of the patient 12.

Also provided is a lifting sleeve member 50 which is nested within the sock member 30 in the first retracted position. In this case, the lifting sleeve member 50 has a third open end region 52 and fourth closed end region 54. The third open end region 52 is arranged, in this case, to engage the first open end region 32 of the sock member 30. In other words, the third open end region 52 nests with the first open end region 32 as shown in FIG. 2.

The lifting sleeve member 50 is made of low friction materials, though other materials may also be used as desired, depending on the nature of the support surface 24, the condition of the patient 12 and/or clothing worn thereby, among other possible factors and is dimensioned for the fourth closed end region 54 to be near the second closed end region 34 of the sock member 30 and adjacent its second surface 38 when the sock member 30 is in the first retracted position, as shown in FIGS. 1 and 2. In other words, the lifting sleeve member 50 is arranged to be inside the sock member 30 in the first retracted position. In turn, the sock member 30 is arranged to be inside the lifting sleeve member 50 in the second deployed position, as shown in FIG. 3. As will be described, the sock member 30 is retractable from within the lifting sleeve member 50 after the sock member 30 has reached the second deployed position.

Each of the third and fourth end regions 52, 54 of the lifting sleeve member 50 include third and fourth coupling portions 52*a*, 54*a* respectively for later coupling with a lifting device as shown schematically by way of straps 56. In this case, the coupling portions include eyelets 52*b*, 54*b*, through which to pass lifting clips 56*a* or the like, although other coupling arrangements may be used as desired.

A fluid inlet port 60 is provided to deliver the pressurized fluid to the chamber 16 to provide the operative pressure. The fluid inlet port 60 is located adjacent the boundary wall 35 and includes a fitting 62 for engaging a fluid passage, in this case an air hose 64 therewith. The sock member 30 may, for example, be operable to progress along the access region 22 when the chamber is pressurized at a range of 3 to 10 psi. However, in other situations, it may further be desirable for the sock member 30 to be operable to progress along the access region 22 when the chamber is pressurized at pressures not exceeding 4 psi, or other pressure limits beyond which the device may be found to deploy with excessive migration speed and to cause discomfort to the patient. However, other pressures may be applicable.

A first tension member 68 extends between the second closed end region 34 of the sock member 30 and the boundary wall 35. In this case, the boundary wall 35 has a passage 35*a* therethrough to receive the first tension member 68 which is attachable through the eyelet 40*a* of the second coupling portion 40, either with a permanent or releasable connection.

The first tension member 68 has a free end region 70 to extend beyond the boundary wall 35. The free end region 70 includes a handle formation 72 and the tension member 68 has a length sufficient to extend from the boundary wall 35 through the inner chamber 16 to the second coupling portion 40 when the sock member 30 is in its second deployed position.

Also provided is a second tension member 74 which is coupled through the eyelet 54*a* of the fourth coupling portion to permit the lifting sleeve member to be retracted as will be described. When the sock member 30 and the lifting sleeve member 50 are in the first retracted position, the second tension member 74 may be arranged to extend along the length of the barrel between the second surface 38 on the sock member 30 and the third surface 76 on the lifting sleeve member 50. The second tension member 74 may then double back beyond the first open end region 32, again between the sock member 30 and the lifting sleeve member.

While the device 10 makes use of an air hose to deliver pressurized fluid to the chamber, other arrangements may be utilized, such as a plug-in (line powered) or battery powered blower unit which may be integrally formed with or separate from the device. In addition, motorized or otherwise powered arrangements may be employed to retract the first and/or second tension members. Moreover, other arrangements may be employed to retract the corresponding second and fourth closed end regions 34, 54 respectively, in place of the first and second tension members 68, 74.

Thus, the device 10 may be considered to provide, in one example, two nested tubular inserts within the elongate barrel. Firstly, the device has the sock member with its open end attached to the leading edge of the barrel and its closed end retracted, in this example, by a fine cord attached to its closed end and passing through the closed end of the elongate barrel or stiff tube. Secondly, a tubular sleeve member or sling tube is located inside the sock member and has a lifting eyelet at each end and which also has a retracting line.

Thus, the device 10 is operated by first establishing the sock member 30 in its retracted position by pulling the first tension member 68, with the first open end region 32 engaging the leading edge region 20 as above discussed. Next, the lifting sleeve member 50 is installed by engaging the third end region 52 with the first open end region 32 and with the lifting sleeve member 50 nested inside the sock member 30 with the fourth closed end region 54 and second tension member 30 adjacent the second closed end region 34, or with the second tension member 30 extending beyond the leading edge region 20 between the elongate barrel 18 and the third open end region 52 as shown in FIG. 2. Thus, these steps allow the device 10 to be readied by loading the soft, inflatable air-bag-like nature of the sock member 30 into the elongate barrel applicator and thereafter the tube-like low-friction lifting sleeve member in the exposed sock member, both of which may be fed into place by a push rod as shown in FIG. 4*a*.

The device 10 in its assembled condition is placed at the access region (or a point of insertion), to penetrate the region beneath the patient's body at the access region, a sufficient distance to ensure transfer of the deploying sock member therethrough and, to the extent possible, minimizing discomfort to the patient.

Air pressure is applied to pressurize the inner chamber by activating the fitting 62, thus progressively deploying the sock member 30 and the lifting sleeve member 50 to emerge from the leading edge region, unfurling from inside themselves and displacing the patient's skin or clothing from the support surface 24 (such as provided by on a mattress on a bed or gurney, or a stretcher or the like) as the nested sock member and lifting sleeve member travel beneath the patient's body inward of the access region 22 with little, if any, relative movement or motion between the majority of the contacting surfaces of the sock member 30 and the patient or the patient support, caused by this unfurling progression. This relative movement will vary from case to case. For instance, the sock member may momentarily randomly bunch up or fold back on itself temporarily as it unfurls beneath the patient. Therefore, the feature of minimal relative movement should be considered a general qualitative observation and not an absolute one. The relative movement, or lack thereof, may be considered in light of the other benefits of the device in which the patient may be readied for a transfer procedure with possible reduced discomfort experienced by the patient under conventional cases where the patient is manually adjusted by attending staff, while they need not be subject to the degree of manual exertion sometimes needed in such manual adjustments.

After the sock member 30 and lifting sleeve member 50 extend beyond the distal side of the patient, the compressed air in the inner chamber is held, or partially or fully relieved or released, and the sock member 30 is retracted back into the elongate tubular member 30 by way of the first tension member 68. In this position, then, the sock member 30 is inside the lifting sleeve member 50 and the fourth closed end region 54 is now beyond the leading edge region 20 with the second tension member 74 extending back toward the patient between the sleeve member 30 and the lifting sleeve member 50. The lifting sleeve member 50 may thus be removed from the leading edge region 20 and the sock member 30 removed from inside the lifting sleeve member by way of the first tension member 68, leaving the lifting sleeve member in place, under the patient. The device 10 may then be used to insert other lifting sleeve members.

Given that the lifting sleeve member 50 has lifting eyelets (or in other examples loops or other suitable configurations) built into each end and now spans across the underside of the patient, lifting straps 56 from a lifting device (not shown) may be used with a lift to raise the patient or parts of the body in stages. The lifting sleeve member 50 may then be removed from beneath the patient by turning it back inside itself by pulling the second tension member 74 to draw the fourth closed end region 54 back toward the third open end region 52 causing the lifting sleeve member 50 to invert in a manner reversing the prior unfurling step, again with the aim of causing minimal relative movement between the patient and the lifting sleeve member.

Thus, the sock member 30 may be used to transport the lifting sleeve member under the patient's body. The sock member 30 may then be retracted by pulling on its retraction line. This leaves the lifting sleeve member 50 in place and the device 10 may be reloaded with a second lifting sleeve member to repeat the installation steps for the second lifting sleeve member.

The lifting sling tube or tubes may thereafter be used to raise the subject (person, animal such as a horse or other load) a short distance so that a proper comfortable lifting sling can be easily inserted under the patient or removed from under the patient without effort. When the task has been completed the lifting tubes can be easily retracted by gently pulling on their lines and causing them to invert as they are retracted, at reduced effort, which may be further aided if low-friction materials are used to make the lifting tube. However, other materials may also be used in other circumstances, if need be.

Thus, the device provides an improved method of preparing a patient for a lift or transfer, by the use, in one example, of a fabric tube or 'sock' that crawls under the patient as it is inflated. It transports a separate 'sling tube' (also called 'lifting sleeve') with it as they crawl forward together under the patient, with minimal relative movement between the inverting tube and the patient or the bed. The tube rolls forward as it is inflated gradually or progressively separating the patient from the bed surface. Once the sock and the sling tube appear on the other side of the patient the sock may be retracted leaving the sling tube in place to be used in lifting the patient. If desired, the sling tube may itself be made up of variable geometry. For example, a set of secondary sling tubes may unfurl from a primary sling tube part way along a primary sling tube to form a crossed pattern, such as a T pattern or other pattern as desired. The sling tube may also be retracted by pulling on a line that causes it to invert and be removed, again with minimal relative motion between the sling tube surface and the patient's skin (or clothing), or the bed. If desired, the device may then be used to insert more sling tubes under the patient. The sling tubes thus may be used as lifting sleeves that may attach to a patient lift to raise the patient a short distance. This would allow a caregiver to slide a full lifting sling underneath or to remove a full sling. Alternatively the sock members themselves may be joined together under the patient to form a sling-like structure or arrangement. If desired, the first and/or second tension members (which may include a strap, for instance) may be an integral part of or integrally formed with the sling tube. Further, the lifting sleeve members may be arranged to be capable of bearing the load of the patient or may be provided with a strap integrally formed therewith that bears the load of the patient.

While the sock member is removably attached to the barrel, the sock member may instead be permanently attached to the barrel. The sock member may be used, if desired, as the lifting member, thereby eliminating the need for the additional lifting sleeve member. The sock member may be used to deploy items other than a lifting sleeve along the access region, such as clothing and the like. The barrel is shown above to be generally circular in cross section, though it may be provided in other cross sectional configurations, such as oval, rectangular and the like, while provision is made for the sock member and lifting sleeve members to be complementary therewith.

While the device 10 makes use of compressed air to enable the sock member 30, other compressible fluids may be used such as $CO_2$, $N_2$ or other inert gases or the like. The compressible fluids may be delivered, for example by the way of a portable tank, such as a 2.5 lb or a 10 lb tank. $CO_2$ may be desirable because it may be compressed to a liquid at about 2000 psi, so a relatively small tank may hold much more volume of $CO_2$ than a similar quantity of air. Further, non-compressible fluids may be used, such as water and normal plumbing operating pressures may be useful, or alternatively pressures generated by a suitably configured pump, either of the portable or permanently installed variety.

While the device 10 is discussed in the context of lifting a patient, it will be understood that the device 10 may be used with any number of other articles or living objects such as animals, in which the features of the device 10 may be beneficial over other lifting devices and/or functions.

Figure 11:
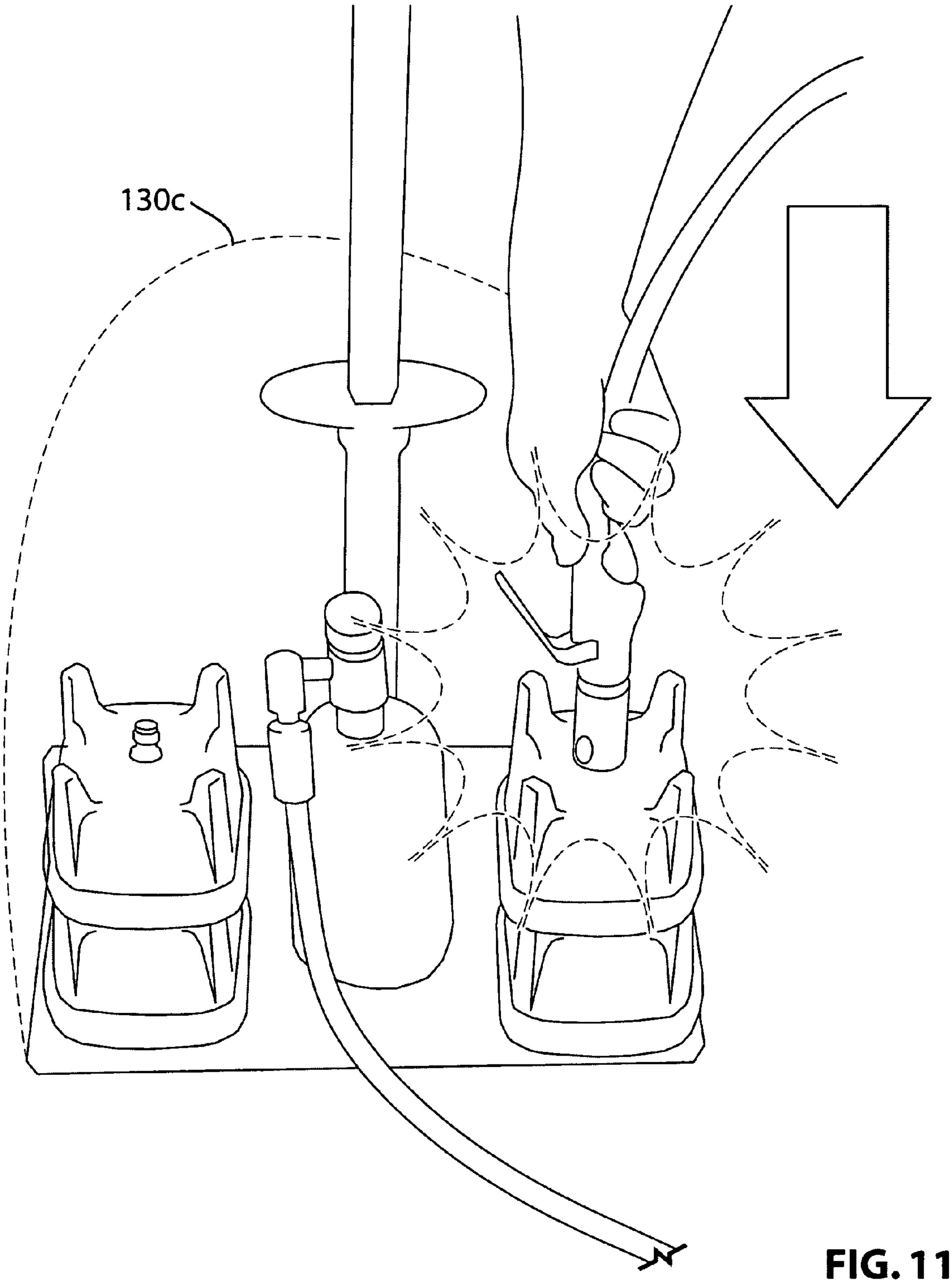
Figure 12:
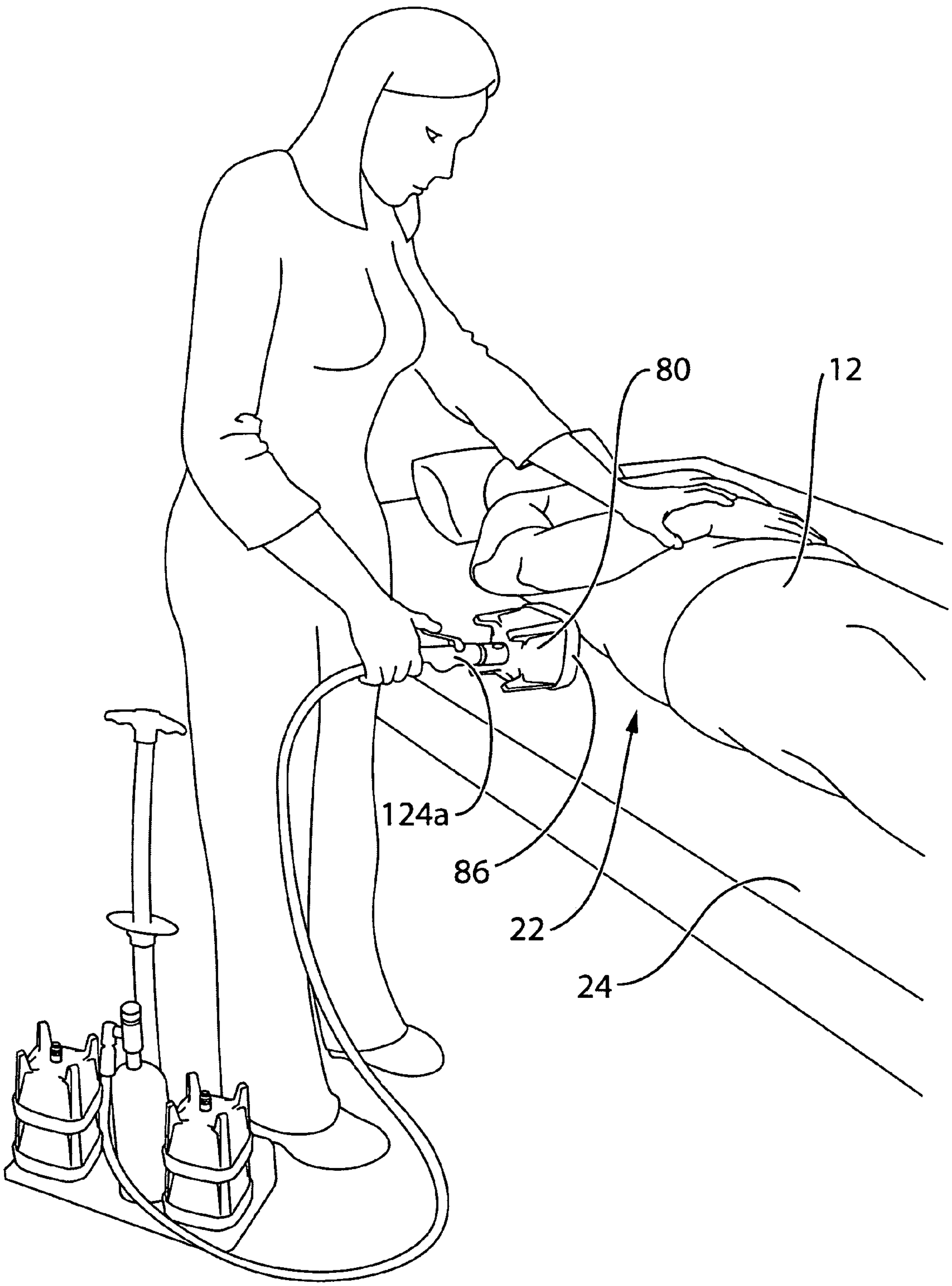

Referring to FIGS. 5 to 17, there is provided another device 80 for lifting a subject. In this particular example, as with the previous illustrated example, the subject is a patient 12 but may be used to aid in the lifting of a range of articles or objects. The device 80 includes a housing 82 having an inner chamber 84 and a leading edge region 86 in fluid communication with the inner chamber 84. Referring to FIG. 12, the leading edge region 86 is arranged to engage an access region 22 between a patient 12 and a support surface 24 beneath the patient. An elongate tubular member is provided at 88 as shown in FIGS. 6*a* to 6*c* with a first open end region 88*a* and a second closed end region 88*b*. The elongate tubular member 88 is shown in FIG. 6*a* in a retracted (or recoiled) position, in FIG. 6*b* in an intermediate deployed position and in FIG. 6*c* in a fully deployed position.

As can be seen in FIG. 6*c*, the first open end region 88*a* is directly or indirectly in fluid tight relation with the leading edge region 86. The elongate tubular member 88 has a first surface 88*c* in fluid communication with the chamber 84 and an opposite second surface 88*c*.

Figure 13:
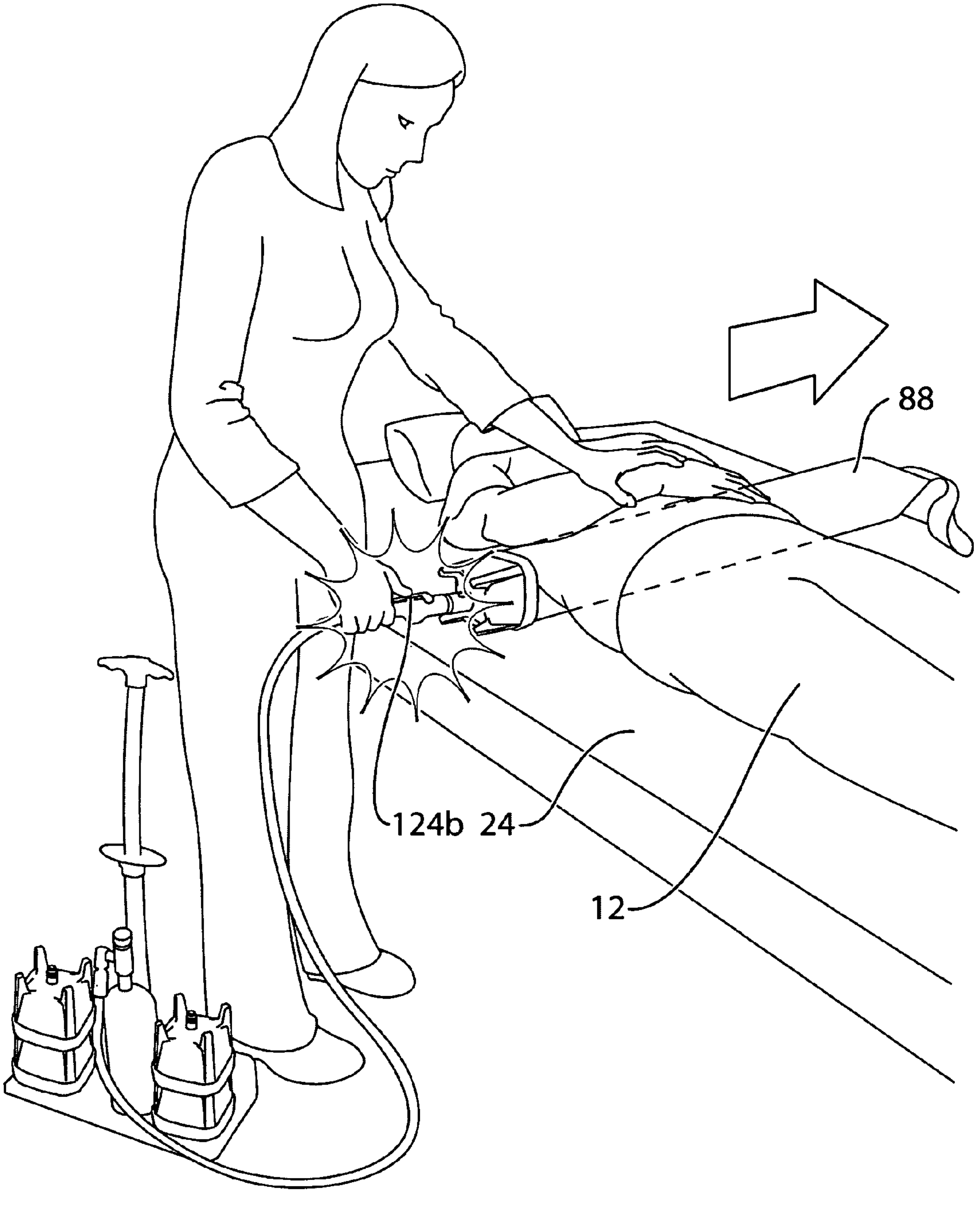
Figure 17:
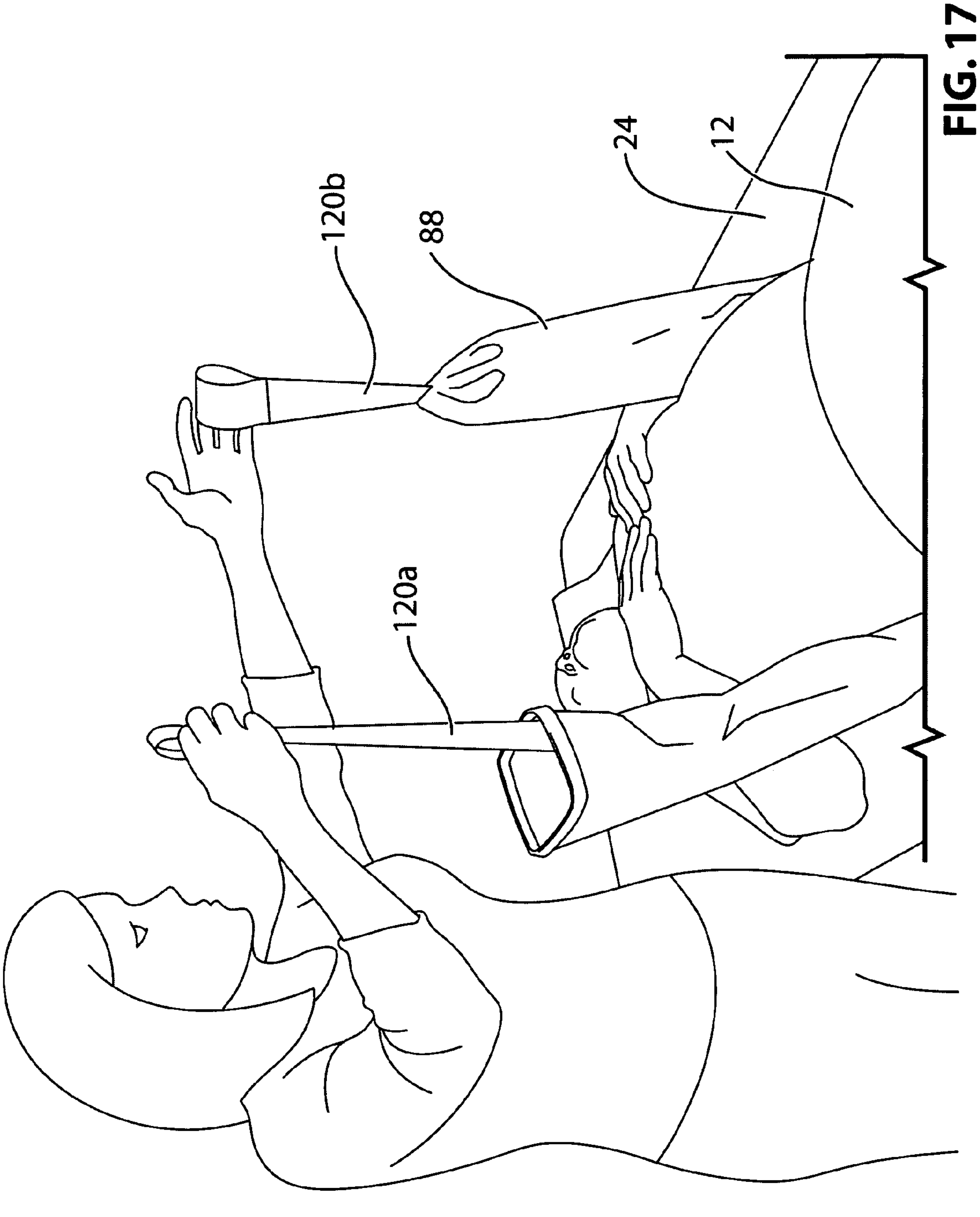

The housing 82 has a generally rectilinear or a generally circular cross-section and is arranged to provide a retracted position in which the elongate tubular member 88 is held relative to the leading edge region 86, so that the elongate tubular member 88 may be responsive to an operative pressure within the inner chamber 84 to unfurl beyond the leading edge region 86. With this unfurling action, the elongate tubular member 88 migrates along the access region 22 with the second surface 88*d* in contact with the patient 12 and the support surface 24. As described earlier, the aim of this unfurling action is to minimize relative motion between the contacting surfaces of the elongate tubular member 88, the patient 12 and the support surface 24, while the elongate tubular member 88 extends or migrates toward a deployed position (as shown in FIGS. 6*c*, 13 and 17) in which the elongate tubular member 88 extends a distance exceeding a lateral dimension of the patient 12, with opposed ends of the elongate tubular member 88 being available to be employed for lifting the patient 12 from the support surface 24.

Figure 5:
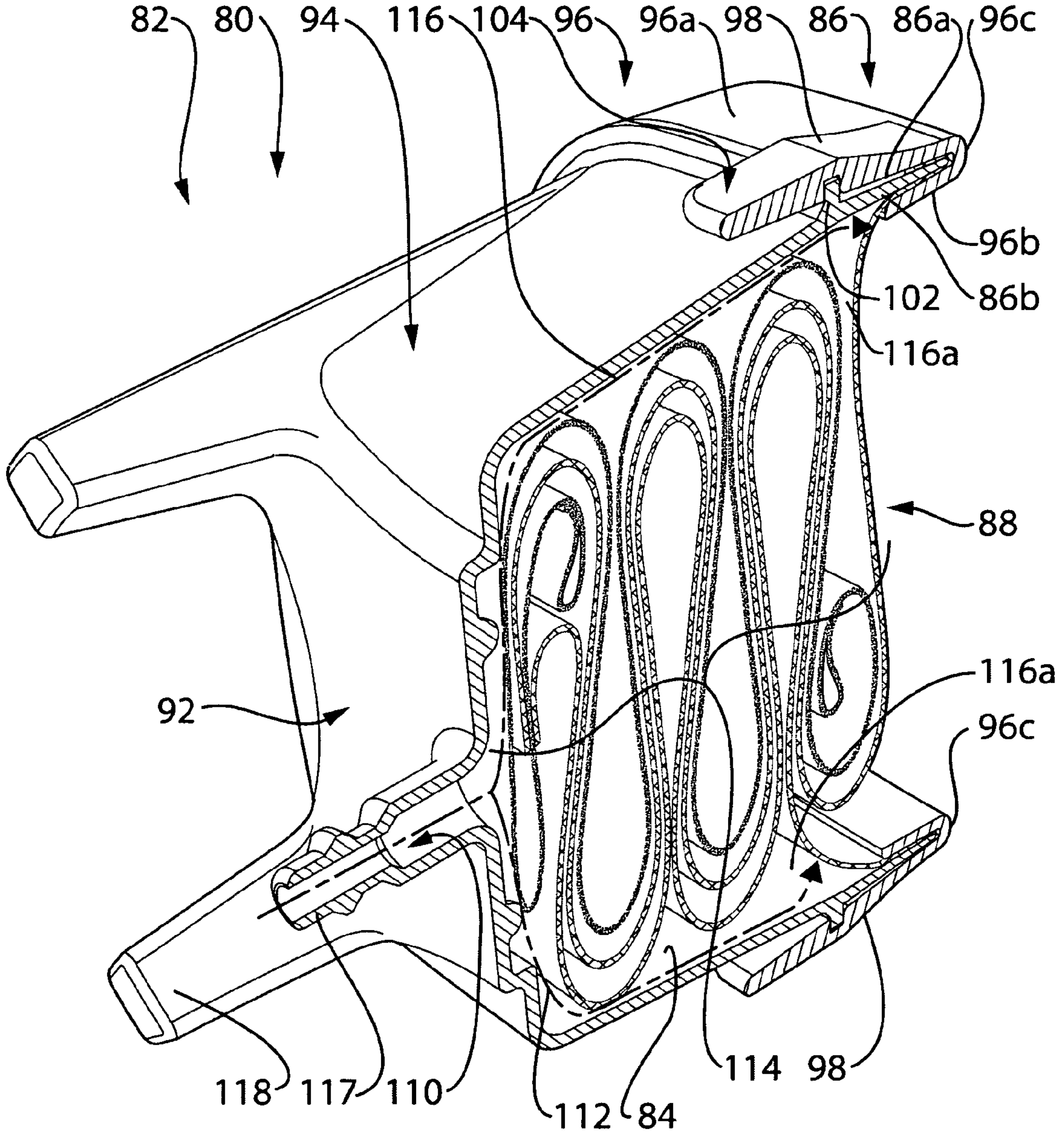
FIG. 5 is a sectional perspective view of another device for lifting an object.
Figure 6A:
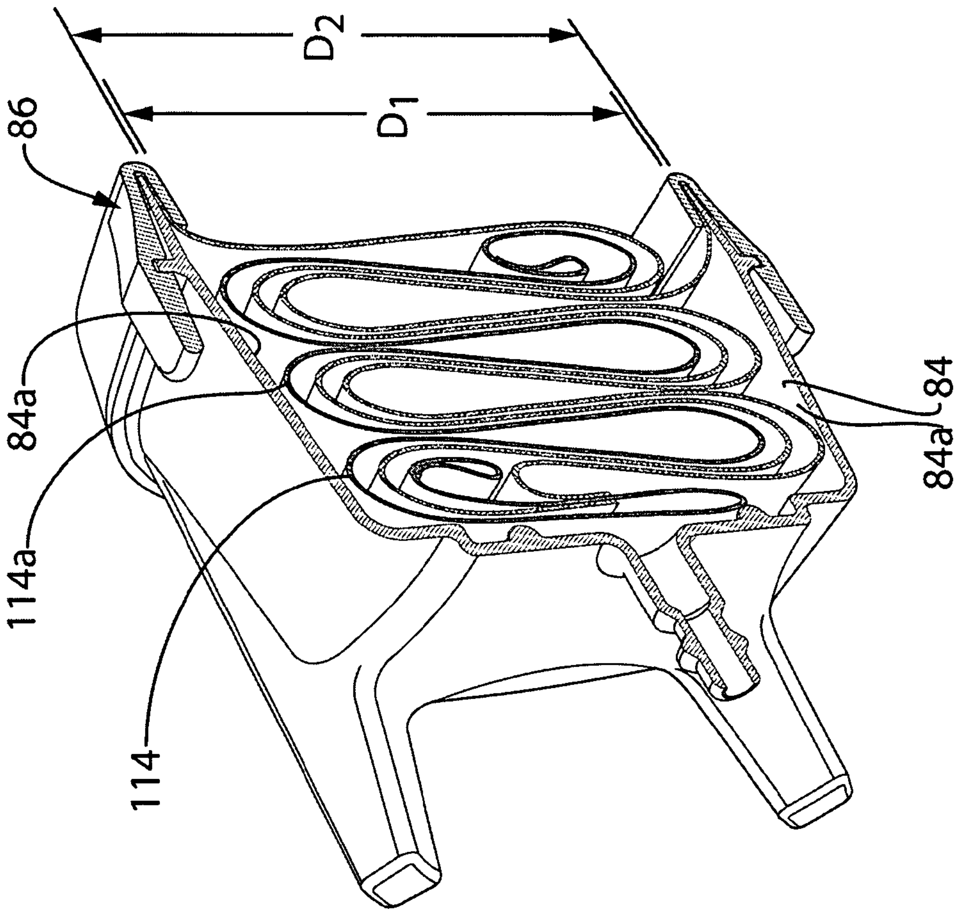
FIGS. 6*a*, 6*b* and 6*c* are sectional perspective views of another device for lifting an object.
Figure 6B:
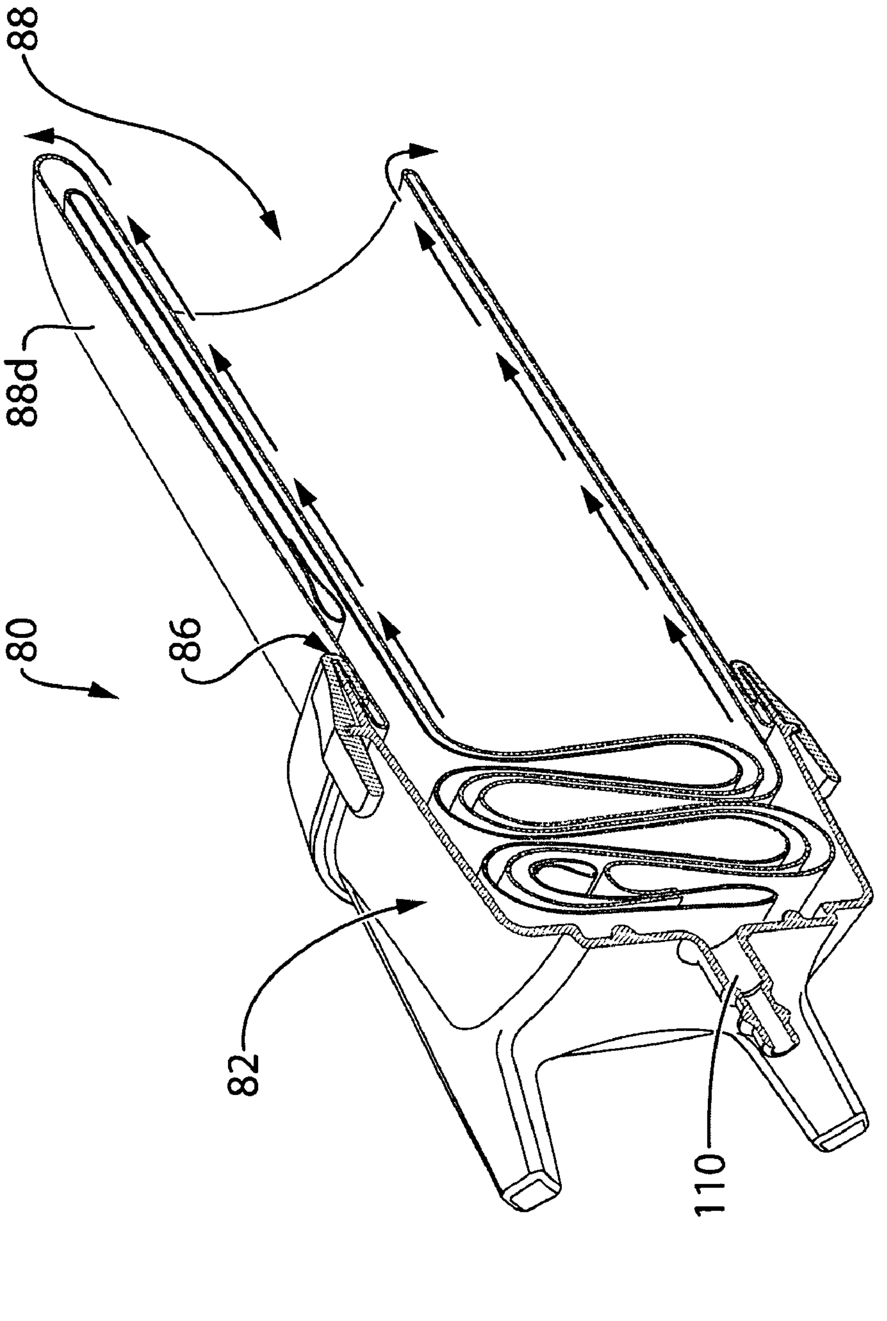
Figure 6C:
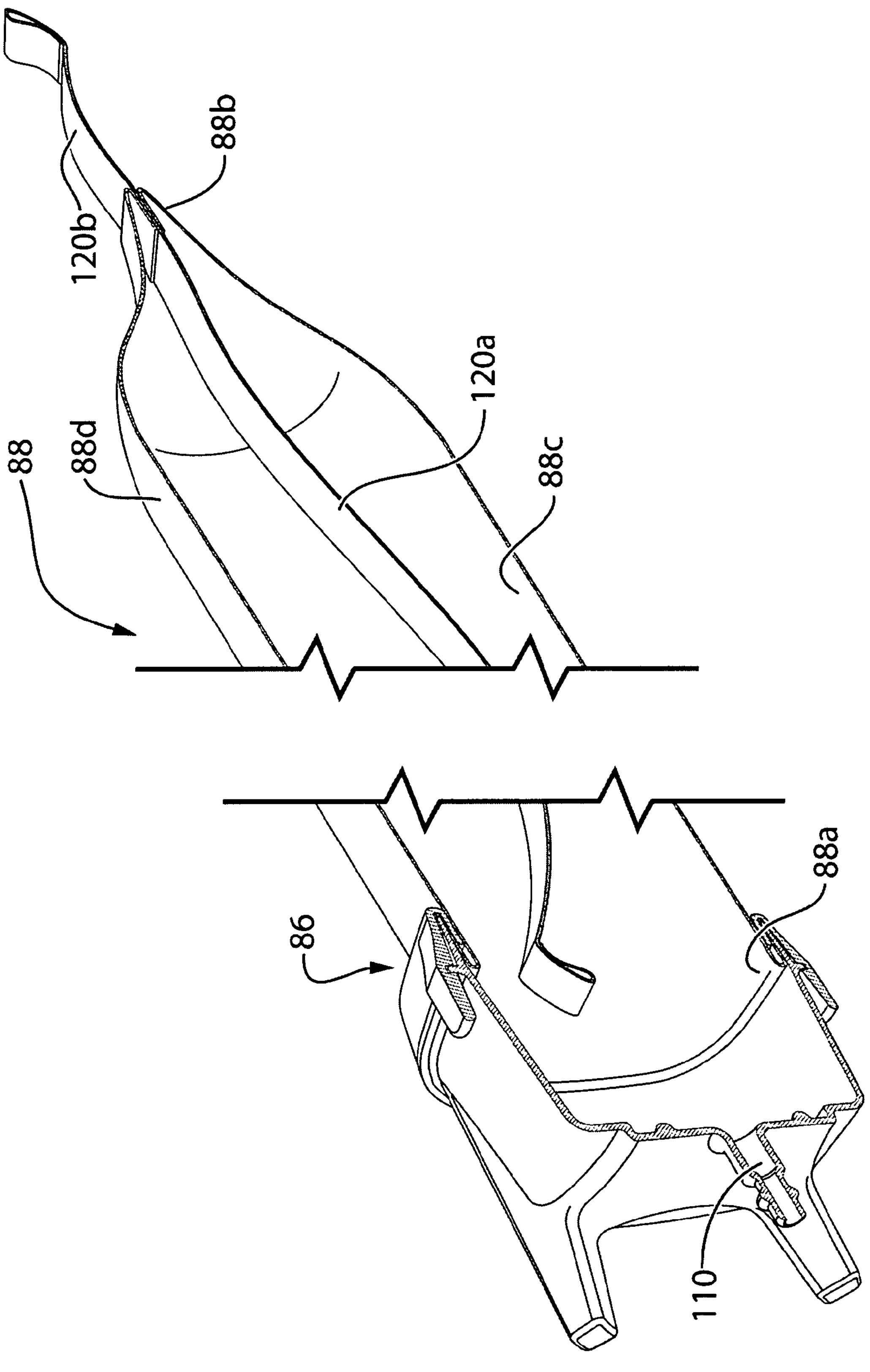
Figure 7:
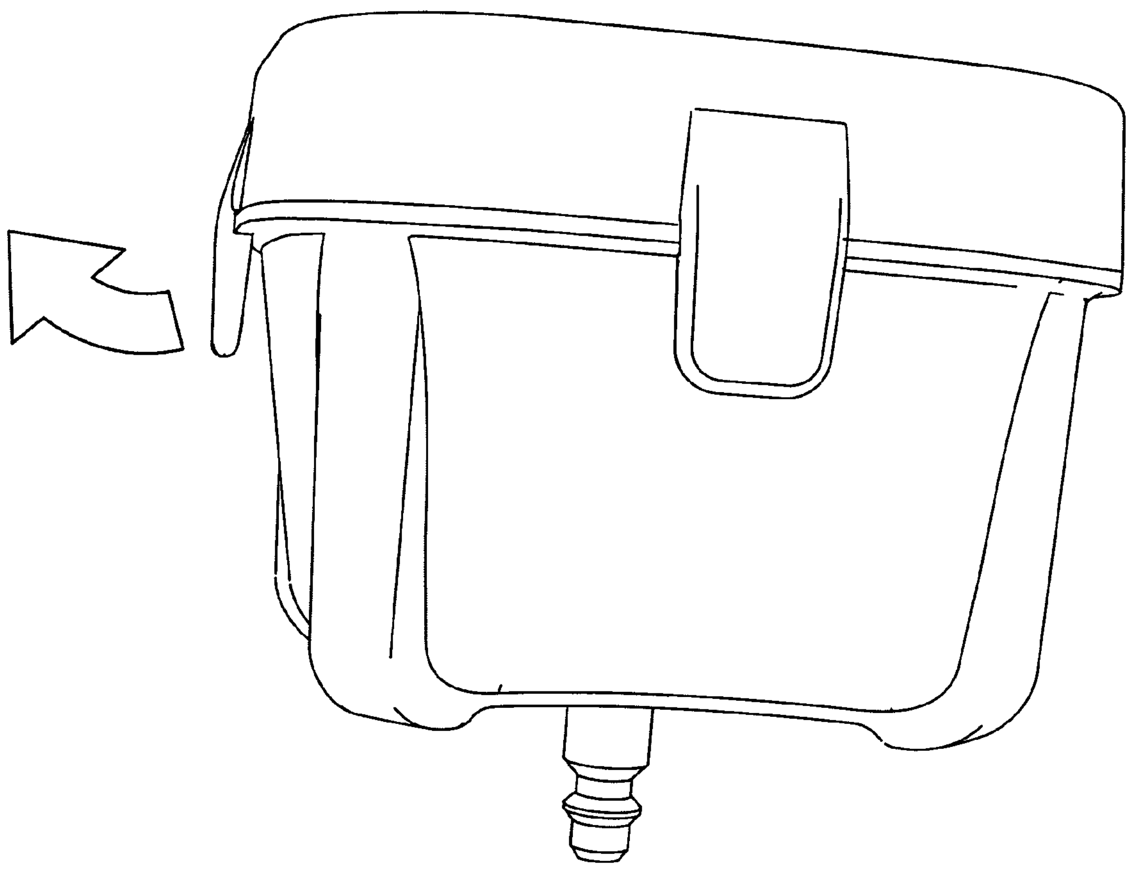
FIG. 7 is a side view of the device of FIG. 6.

As can be seen in FIG. 5, the housing 82 includes a back wall portion 92 and a side wall portion 94, the side wall portion 94 defining the leading edge region 86. A coupling ring portion 96 is provided for engaging the side wall portion 94 at the leading edge region 86.

The leading edge region 86 includes an outer surface 86*a* and the coupling ring portion 96 has an outer section 96*a* to engage or otherwise lie adjacent to the outer surface 86*a*. The leading edge region 86 includes an inner surface 86*b*, the coupling ring portion 96 including an inner section 96*b* to engage or otherwise lie adjacent to the inner surface 86*b*.

Figure 15:
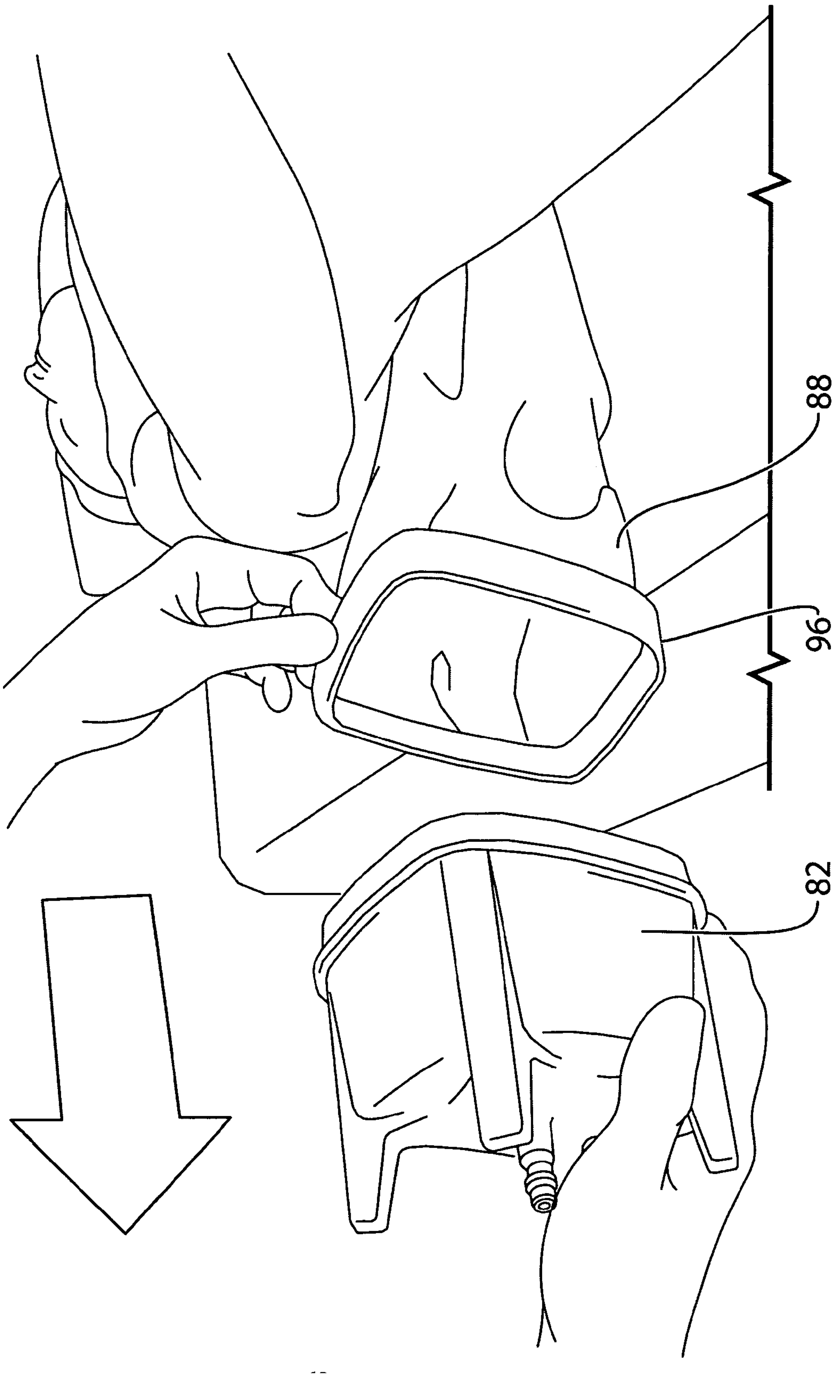
Figure 16:
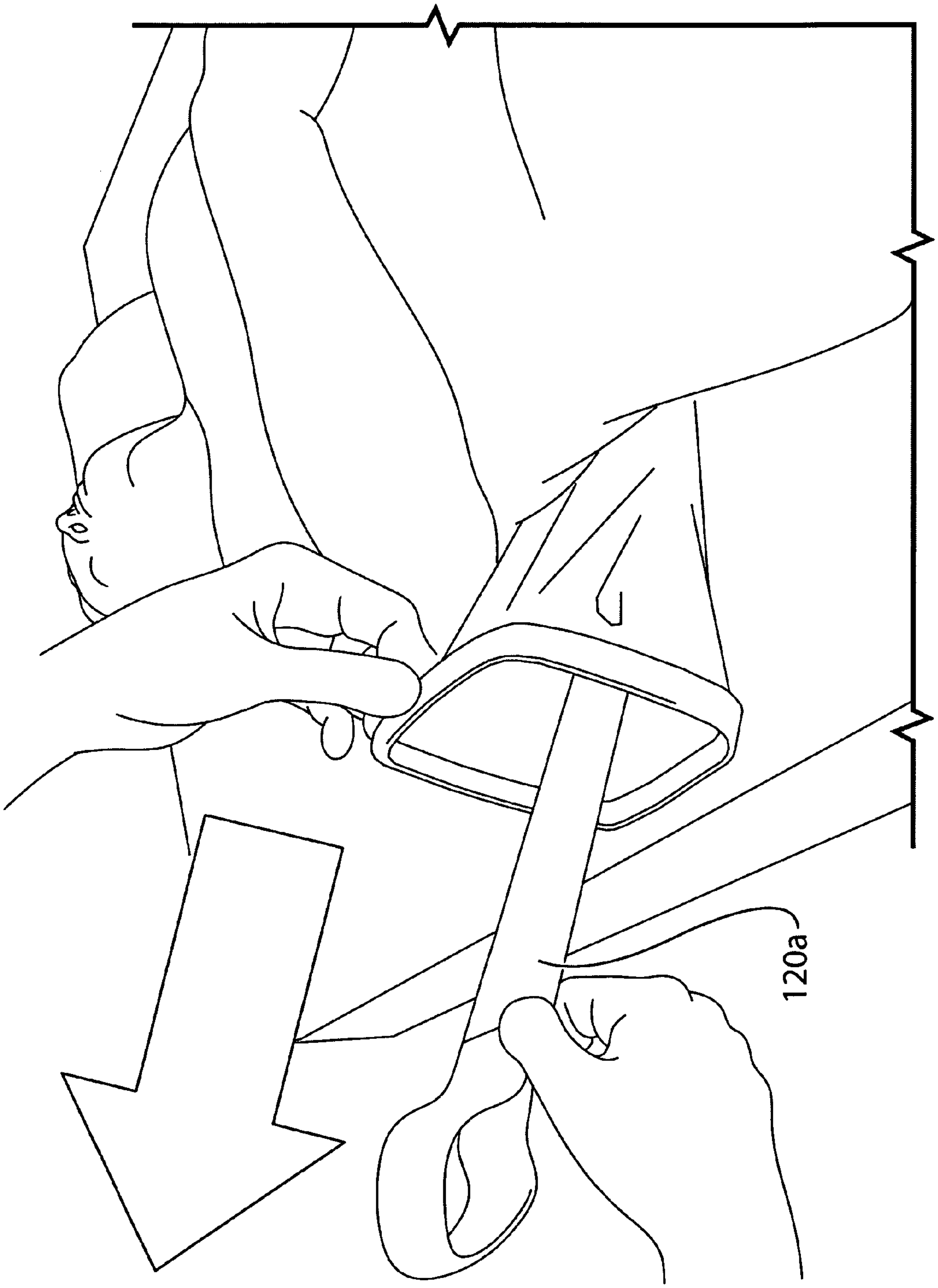

As can be seen in FIGS. 5 and 6*a* to 6*c*, the first open end region 88*a* of the elongate tubular member 88 is arranged to be located between the leading edge region 86 and the coupling ring portion 96. In this case, the elongate tubular member 88 is pinched and/or otherwise held between the leading edge region 86 and the coupling ring portion 96. Alternatively, the elongate tubular member 88 may be attached directly to the coupling ring portion 96 as shown in the embodiment of FIG. 15 to 17. In either case, removal of the coupling ring portion 96 releases the elongate tubular member 88 from the housing 82.

To that end, one or more locking portions 98 are anchored to the coupling ring portion 96 and/or the housing 82 for locking the coupling ring portion 96 relative to the leading edge region 86. The coupling ring portion 96, in this case, includes a distal outer surface portion 96*c*, and the housing 82 includes an anchor ridge 102, as shown in FIG. 5. The one or more locking portions 98 include opposed locking tabs 104 mounted on the coupling ring portion 96 to engage the anchor ridge 102, in this case opposite the distal outer surface portion 96*c*. The anchor ridge 102 may, in other examples, be replaced by ridges, recess or other suitable locking formations to establish a lock wt the locking tabs 104.

Figure 8:
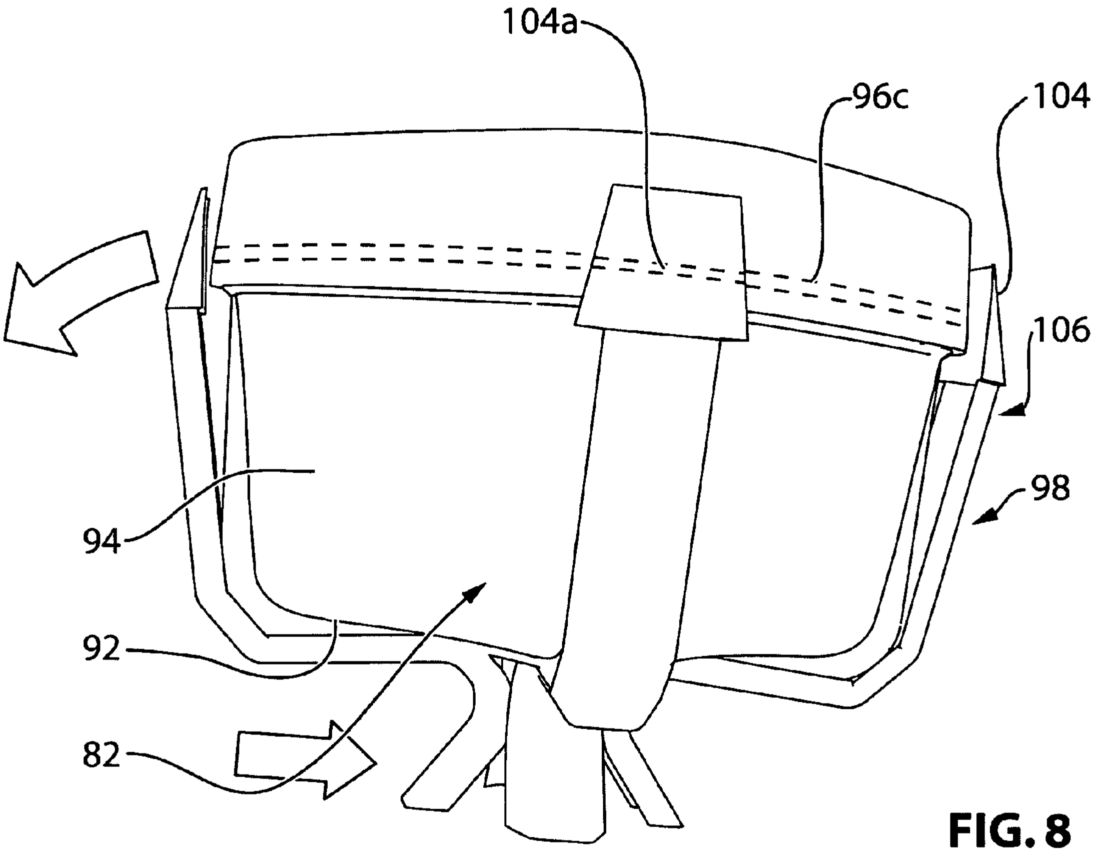
FIGS. 8, 8*a* and 9 are side views according to FIG. 7, of other devices for lifting an object.

In another example, as shown in FIG. 8, the one or more locking portions 98 are mounted on the housing 82 at a location remote from the leading edge region 86. In this case, each locking portion includes a finger 106 extending from an anchor location adjacent the back wall portion 92 and extending along the side wall portion 94 toward the leading edge region 86. In this case, the coupling ring portion is provided with a taper toward the leading edge region. The locking tabs are, in this case, also provided with a complementary taper to engage the coupling ring portion when engaged therewith. However, other configurations may also be employed to provide a more positive locking engagement between the coupling ring portion and locking tabs, such as by way of a combination of mating lips, ridges and/or grooves on both, as shown in dashed lines at 96*c*, 104*a*.

Figure 8A:
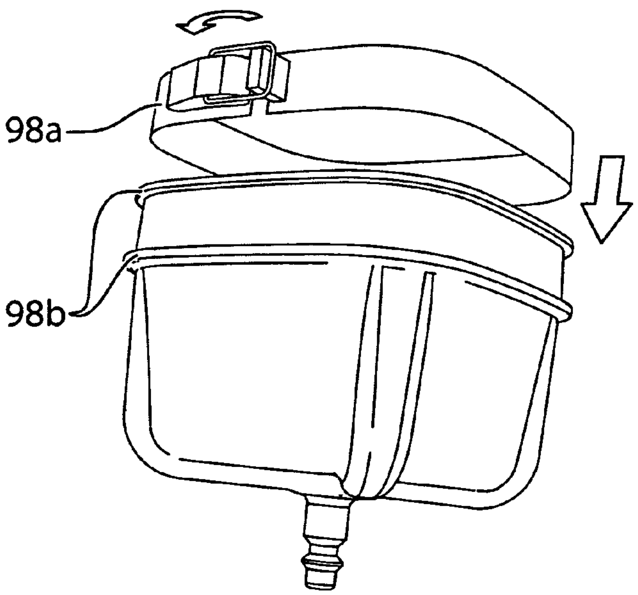

The coupling ring portion may also be provided in the form of a band which may be fixed length or length extensible and/or fixable in a predetermined length with one or more releasable couplings such as clips, fasteners and the like, as shown by the releasable clip at 98*a* in FIG. 8*a* In this case, the band is located between a pair of adjacent anchor ridges 98*b*.

Figure 9:
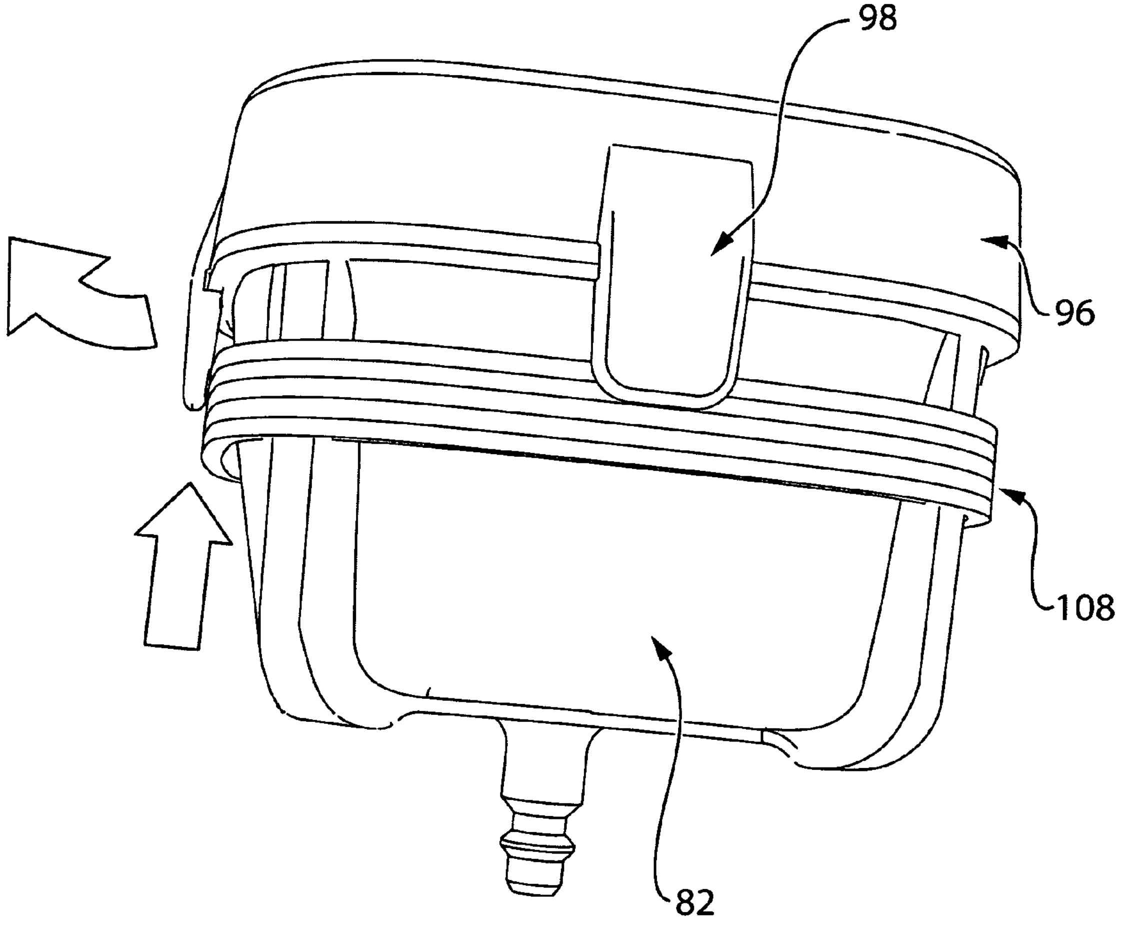

Still a further example, as shown in FIG. 9, includes a release member 108 slidably engageable with the housing 82 and movable toward a release position shown in FIG. 9 in which the release member 108 engages the locking portions 98 to release the coupling ring portion 96. Other configurations including other tabs, clips, fasteners or the like may be utilized to hold the coupling ring portion with the housing. If desired, other arrangements may be used to secure the elongate tubular member 88 to the housing 82.

As can be seen in FIG. 5, the elongate tubular member 88 is operable to assume a nested configuration within the inner chamber 84 to form a nested body 114. The back wall portion 92 includes a passage 110 to receive a supply of pressurized fluid therethrough to inflate the elongate tubular member 88. The back wall portion 92 includes a plurality of projections 112 to space the elongate tubular member 88 away from the back wall portion 92.

The nested body is shown at 114. In this case, the nested body 114 and the inner chamber 84 are further arranged to form at least one channel or pathway shown in chain dotted lines at 116 to bypass or skirt the nested body 114 and deliver the pressurized fluid from the passage 110 to an annular region 116*a* around the nested body adjacent the coupling ring portion 96. In this configuration, the nested body 114 enables an outer portion of the elongate tubular member 88 adjacent to the coupling ring portion 96 to progressively unfurl from the nested body 114.

Referring to FIG. 6*a* to 6*c*, in this arrangement, the nested body 114 has an outer boundary 114*a* of a predetermined first lateral dimension D1, and the inner chamber 84 has a pair of opposed inner faces spaced by a predetermined second lateral dimension D2. The first lateral dimension D1, in this case, is smaller than the second lateral dimension D2 to form a gap between the nested body 114 and the opposed inner faces to permit the pressurized fluid to be delivered from the passage 110 along the channel to a region adjacent the leading edge region 86. The nested body 114 is thus further configured to permit the elongate tubular member 88 to begin to expand from the nested body from a location adjacent the leading edge region 86.

It can be seen in FIG. 6*a* to 6*c* that the inner chamber 84 has a pair of opposed inner faces 84*a* and the nested body 114 is dimensioned smaller than the inner chamber 84 to form a gap therebetween to permit the pressurized fluid to be delivered from the passage 110 to a region adjacent the leading edge region 86 for unfurling the elongate tubular member 88 from the nested body 114.

Referring to FIG. 5, there is also provided an external pressurized fluid fitting 117 located on a back wall portion 92 of the housing 82 and in fluid communication with the passage 110. The back wall portion 92 also includes a plurality of outer support posts 118 symmetrically arranged in spaced relation relative to the pressurized fluid fitting 117. The outer support posts 118 are located to fit within a leading edge region 86 of a housing from a neighbouring device 10 to form a stack of devices, as can be seen in FIG. 10.

Referring to FIG. 6*c*, the elongate tubular member 88 includes a first strap portion 120*a* on one side of the second closed end portion 88*b* and interior to the elongate tubular member 88 and a second strap portion 120*b* on an opposite side of the second closed end portion 88*b* and exterior of the elongate tubular member 88. The first and second strap portions may be separate or part of a single strap which is sewn through the second closed end 88*b*.

Figure 10:
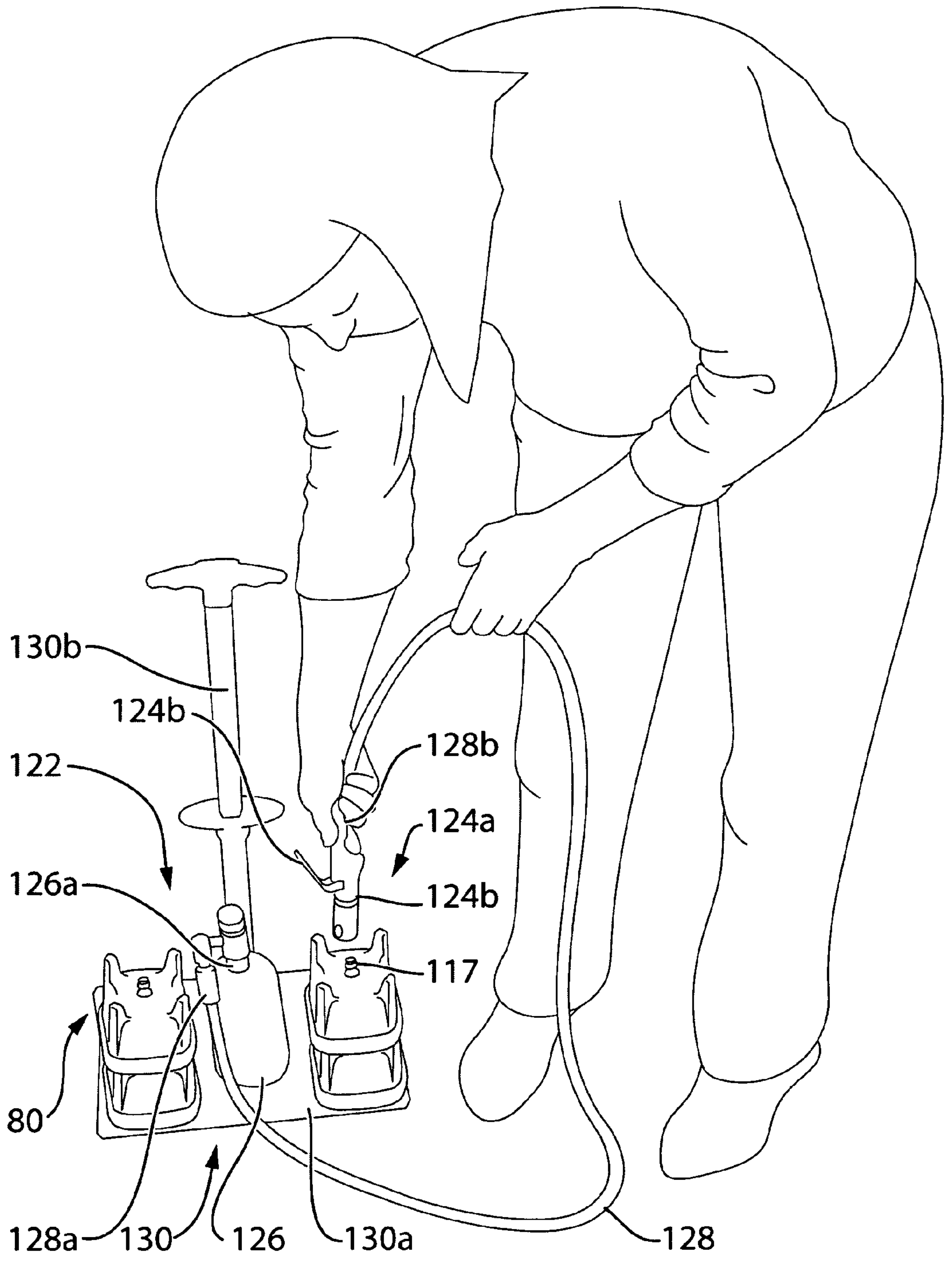
FIGS. 10 to 17 perspective views showing a method for lifting an object.

Referring to FIG. 10, a pressurized fluid supply 122 is provided for coupling with the pressurized fluid fitting 117, and a control portion 124 for controlling delivery of pressurized fluid thereto. In this case, the pressurized fluid supply 122 includes a pressurized fluid tank 126 with an outlet valve 126*a* (including a regulator as desired), a fluid hose 128 having a first end portion 128*a* coupled to the outlet valve 126*a*. The fluid hose 128 has a second end portion 128*b* and the control portion 124 includes a control valve 124*a* coupled to the second end portion 128*b* and complementary with the pressurized fluid fitting 117. In this case, the control valve 124*a* has a trigger 124*b* to release pressurized fluid from the fluid hose 128. A support structure is also provided as shown at 130 together with a base 130*a* and a handle 130*b* for supporting a number of nested lifting devices 80 and the pressurized fluid supply 122 to form a lifting kit which may be transported from site to site as need be. The support structure 130 may also be provided with an enclosure 130*c* as shown in dashed lines in FIG. 11, such as a hard shell carrying case or a soft shell bag or the like.

The kit may thus be used in the following manner. First, the user activates the outlet valve 126*a* on the pressurized fluid tank 126 to pressurize the fluid hose 128. Next, as shown in FIGS. 10 and 11, the user grips and directs the control valve 124*a* to couple the control valve 124*a* with the pressurized fluid fitting 117 of a first of the devices 80 in the kit. As shown in FIG. 12, the user is then able to continue gripping the control valve 124*a* with the device 80 in place and direct the latter so that the leading edge region 86 is at the access region 22. As shown in FIG. 13 (and FIG. 5), the user then depresses the trigger 124*b* causing pressurized fluid to enter the passageway 110 and follow the channel 116 to bypass or skirt the nested body 114. The pressurized fluid then pressurizes the inner chamber and the annular region 116*c* around the nested body adjacent the coupling ring portion 96. The nested body 114 is arranged so that the elongate tubular member 88 is able to unfold from the nested body 114 in the annular region, thereby causing the elongate tubular member 88 to deploy outwardly. This can be seen by comparing the views of FIGS. 6*a* to 6*c*.

Figure 14:
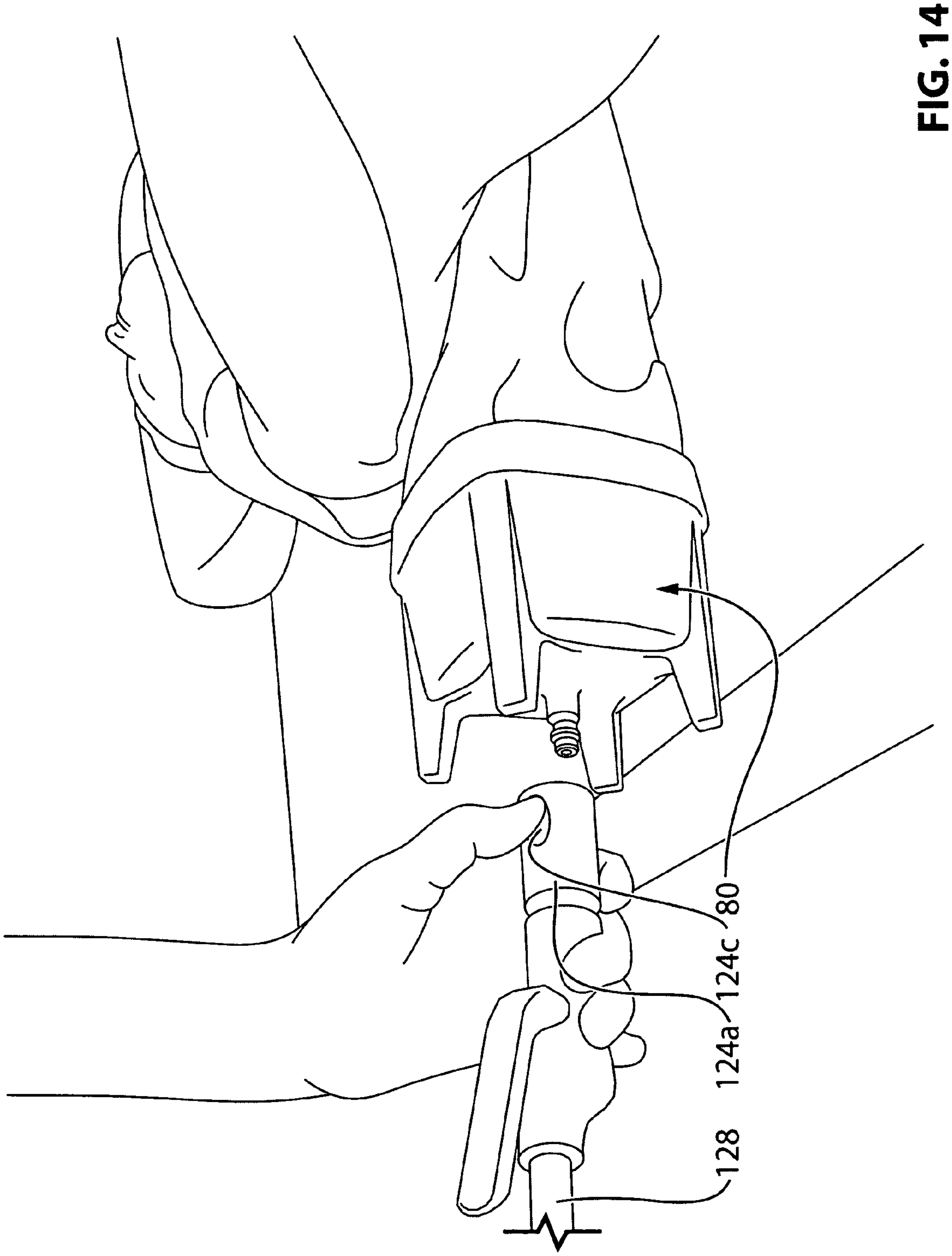

The elongate tubular member 88 can be seen to extend progressively in length from the leading edge region 86 from the inside out as the gathered elongate tubular member unfurls from the nested body 114 and makes its away outwardly as shown by the series of short arrows in FIG. 6*b*. This unfurling continues until the closed end region 88*b* arrives at a location beyond the patient as shown in FIG. 13. As shown in FIG. 14, the user then releases the control valve 124*a* from the pressurized fluid fitting 117 (in this example by way of a release button 124*c*), thereby releasing the device 80 from the fluid hose 128.

The user then removes the coupling ring portion 96 from the housing 82 by releasing the locking tabs 104. In the examples of FIGS. 14 to 17, the coupling ring portion 96 remains with the elongate tubular member 88. The coupling ring portion 96 in this case may have a similar effect as a starched cuff on a shirt sleeve, such that it does not otherwise hinder the function of the elongate member by the presence of the coupling ring portion 96. As shown in FIG. 16, the user then reaches through the elongate tubular member (with or without the coupling ring portion attached thereto) and grasps the first strap portion 120*a* and reaches over the patient to grasps the second strap portion 120*b* extending outwardly from the closed end portion 88*b*, so that the strap portions 120*a*, 120*b* provide the end of a lifting strap for attachment to a lifting device. This method may then be repeated in whole or in part and in a different order of steps as desired to deploy as many lifting straps as are needed to lift the person.

The strap portion 120*a* of the fabric sleeve or elongate tubular member 88 may also serve as a retracting device to remove the 'lifting strap' when no longer required. The pulling of the strap portion 120*a* causes the retracting elongate tubular member to travel in on itself in a movement reversing the previously described unfurling motion, but for the fact that the elongate tubular member in this case is not once again placed in its retracted or recoiled position as it is in its pre-use condition in the housing 82 and with minimal, if any, relative motion of the patient's skin/clothing and the support surface as desired earlier.

Figure 18:
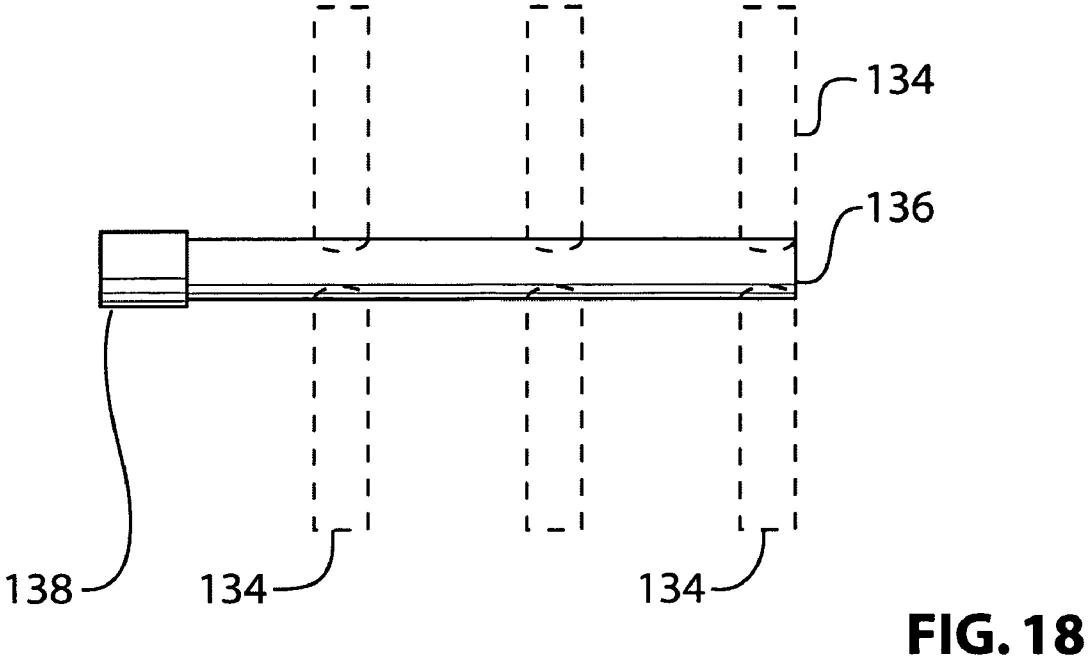
FIGS. 18, 19 and 20 are schematic views of other devices for lifting an object.
Figure 19:
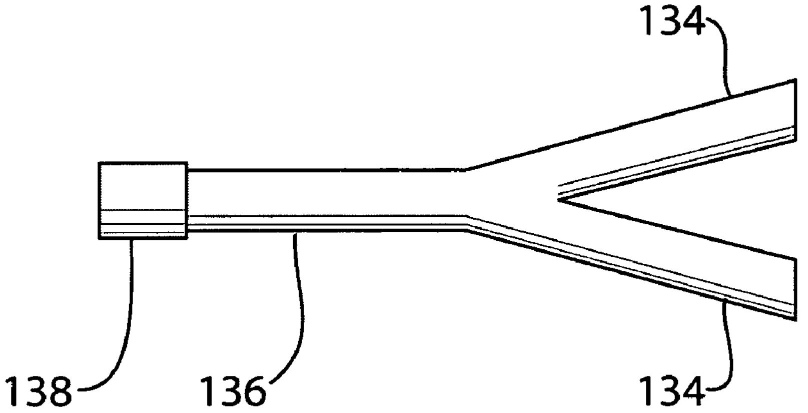
Figure 20:
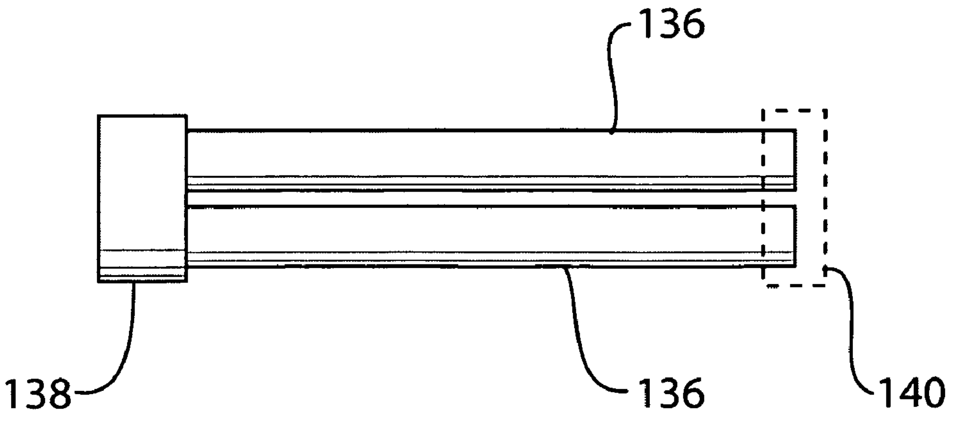

As mentioned earlier, if desired, the elongate tubular member may be provided in different arrangements. For instance, as shown in FIG. 18, a set of one or more secondary elongate tubular members 134 may unfurl laterally or at a prescribed angle relative to an central elongate axis from a primary elongate tubular member 136, at one or more corresponding predetermined locations along its length to form a crossed pattern, such as a T pattern or other pattern as desired, with the primary elongate tubular member extending from a housing 138. As shown in FIG. 19, a primary 136 elongate tubular member may extend from a housing 138 and bifurcate into a number of (in this case two) secondary elongate tubular members 134. As shown in FIG. 20, more than one (in this case two) primary elongate tubular members 136 may extend from a common housing 138 if desired. Further, one or more elongate tubular members themselves may be coupled, for example by way of a coupling shown in schematic lines at 140 in FIG. 20, for example to form a lifting sling.

The kit device may thus provide, in one example, a strap insertion system for application of a sling under a patient for a mechanical lift device and may include a transport bag or enclosure, a dispenser and strap cartridges, the latter taking the form of a plurality of devices 80 or similar thereto. The transport bag thus may contain the kit and be provided with wheels or the like, along with one or more handles to facilitate the caregiver moving it around. The kit may thus include a small compressed carbon dioxide cylinder (or another type of fluid). The cylinder may be particularly beneficial as it is small, lightweight and portable, as well as quiet, though other sources of pressurized fluids may also be used. The tank may, in one example, be fitted with a regulator with an internal safety valve. The regulator may set the output pressure of the tank at different levels up to 160 psi; though the pressure output to the elongate tubular member may be regulated or fixed if desired (for example for a range of between 10-15 psi) by a bleeder valve and the flow of the gas or fluids may be constricted by a flow valve to an estimated ½ cubic foot per minute, or another volume flow rate as desired. A 10 or 25 foot coiled self-retracting hose, or other length of hose as desired, may be connected to the regulator. A dial may be attached to the regulator for showing the amount of pressure remaining in the tank. Sling strap cartridges may be thus provided in the form of preloaded short pieces of ABS piping (or other suitable material such as plastic or the like) with a fabric (or plastic) elongate tubular member or sock and strap packed inside. The sock may be a fine denier, urethane coated nylon fabric sealed into a sock shape with a double sided tape seam or other suitable seam. This fabric shell may thus surround a nylon or other webbing strap. The strap may be part of the device which will bear the patient's weight. The straps may, for example, be 3" wide though other dimensions may also be utilized as desired. The strap cartridges may be stored in the transport bag and then placed beside the patient and attached to the coiled hose with a quick connect. The tank and regulator may then be turned on and a trigger at the end of the coiled hose be employed to inflate the sealed sock. As the sock inflates it unfurls. The leading edge of the sock may be seen to separate the patient from the bed while advancing across the width of the patient. As the sock crawls under the patient, the strap inside it is delivered under the patient. After the sock is fully unfurled, the coiled hose may be disconnected by the quick connect. The cartridge housing may thus be provided with two mating parts which may be unclipped to remove the cartridge from the sock and strap. The ends of the straps may, if desired, be sewn into loops or other configurations suitable for later coupling with a lifting device. When a sufficient number of straps are inserted along the patient, an 8-point spreader bar or similar lifting contrivance on a mechanical patient lift may be lowered into position above the bed. The straps may thus be attached to the spreader bar and the patient is lifted a hand's width from the bed so the sling can be easily placed under the patient. The patient can be lowered back on the sling and the straps removed by retracting them in on themselves (pulling on the strap end of the sock pulls in on itself, again with little, if any, corresponding relative motion of the patient or bed). The sling may then be positioned so that regular care may commence.

Further features may be found in the following clauses:

A device for lifting an article comprising a housing having an inner chamber, the housing having a leading edge region in fluid communication with the inner chamber, the leading edge region being arranged to engage an access region between an article and a support surface beneath the article, an elongate tubular member having a first open end region and a second closed end region, the first open end region being directly or indirectly in fluid tight relation with the leading edge region, the elongate tubular member having a first surface in fluid communication with the inner chamber and an opposite second surface, the housing being arranged to provide a retracted position in which the elongate tubular member is held relative to the leading edge region and responsive to an operative pressure within the inner chamber to unfurl beyond the leading edge region to cause the elongate tubular member to migrate along the access region with the second surface in contact with the article and the support surface and with minimal relative motion between the contacting surfaces of the elongate tubular member, the article and the support surface and toward a deployed position in which the tubular member extends a distance exceeding a lateral dimension of the article with opposed ends of the tubular member being available to be employed for lifting the article from the support surface.

A device as defined the housing including a back wall portion and a side wall portion, the side wall portion defining the leading edge region.

A device as defined, further comprising a coupling ring portion for engaging the side wall portion at the leading edge region.

A device as defined, the leading edge region including an outer surface, the coupling ring portion having an outer section to engage the outer surface.

A device as defined, the leading edge region including an inner surface, the coupling ring portion including an inner section to engage the inner surface.

A device as defined, the first open end region of the elongate tubular member being arranged to be located between the leading edge region and the coupling ring portion.

A device as defined, the housing having a generally rectilinear or a generally circular cross-section.

A device as defined, the elongate tubular member being pinched and/or otherwise held between the leading edge region and the coupling ring portion.

A device as defined, the elongate tubular member being attached to the coupling ring portion.

A device as defined, further comprising one or more locking portions anchored to the coupling ring portion and/or the housing for locking the coupling ring portion relative to the leading edge region.

A device as defined, the housing including an anchor ridge adjacent the coupling ring portion, the one or more locking portions including opposed locking tabs mounted on the coupling ring portion to engage the anchor ridge.

A device as defined, the one or more locking portions being mounted on the housing at a location remote from the leading edge region.

A device as defined, each locking portion including a finger extending from an anchor location adjacent the back wall and extending along the side wall portion toward the leading edge region.

A device as defined, further comprising a release member slidably engaged with the housing and movable toward a release position in which the release member engages the locking portions to release the coupling ring portion.

A device as defined, the elongate tubular member being operable to assume a nested configuration within the inner chamber to form a nested body.

A device as defined, the back wall portion including a passage to receive a supply of pressurized fluid therethrough to inflate the elongate tubular member.

A device as defined, the back wall portion including a plurality of projections to space the elongate tubular member away from the back wall portion.

A device as defined, the nested body and the inner chamber being arranged to form at least one channel to deliver the pressurized fluid from the passage to an annular region around the nested body adjacent the coupling ring portion.

A device as defined, the nested body being configured for the elongate tubular member adjacent to the coupling portion to progressively unfurl from the nested body.

A device as defined, the nested body having an outer boundary of a predetermined first lateral dimension, the inner chamber having a pair of opposed inner faces spaced by a predetermined second lateral dimension, the first lateral dimension being smaller than the second lateral dimension to form a gap between the nested body and the opposed inner faces to permit the pressurized fluid to be delivered from the passage to a region adjacent the leading edge region, the nested body being further configured to permit the elongate tubular member to begin to expand from the nested body from a location adjacent the leading edge region.

A device as defined, the inner chamber having a pair of opposed inner faces the nested body being dimensioned smaller than the inner chamber to form a gap therebetween to permit the pressurized fluid to be delivered from the passage to a region adjacent the leading edge region for unfurling the elongate tubular member from the nested body.

A device as defined, further comprising an external pressurized fluid fitting located on the back wall portion and in fluid communication with the passage.

A device as defined, the back wall portion including a plurality of outer support posts symmetrically arranged in spaced relation relative to the pressurized fluid fitting.

A device as defined, the outer support posts being located to fit within a leading edge region of a housing from a neighbouring device to form a stack of devices.

A device as defined, the elongate tubular member including a first strap portion on one side of the second closed end region and interior to the elongate tubular member in the nested configuration and a second strap portion on an opposite side of the second closed end region and exterior of the elongate tubular member in the nested configuration.

A device as defined, further comprising a pressurized fluid supply for coupling with the external pressurized fluid fitting, and a control portion for controlling delivery of pressurized fluid thereto.

A device as defined, the pressurized fluid supply including a pressurized fluid tank with an outlet valve, a fluid hose having a first end portion coupled to the outlet valve, the fluid hose having a second end portion, the control portion including a control valve coupled to the second end portion and complementary with the pressurized fluid fitting.

An article lift kit including a plurality of devices of claim 1, each with a fitting for deploying the elongate tubular member, a pressurized fluid supply complementary with each of the fittings, the article lift kit operable for deploying each of a plurality of the devices at corresponding locations along the article, and a control portion for controlling delivery of pressurized fluid at the operative pressure to each corresponding fitting.

A method for lifting a patient, comprising providing an elongate sleeve member held in a first retracted position in a pressurized support, pressurizing the sleeve member in a manner to cause it to unfurl from the first retracted position on one side of a patient, along an intersection between the patient and an adjacent support surface to a second extended position on an opposite side of the patient, releasing the sleeve member from the pressurized support, coupling exposed end regions of the sleeve member to a lifting device, and displacing the lifting device to lift the sleeve member.

A method as defined, the pressurized support including a housing having a side wall defining an inner chamber and a leading edge region in fluid communication with the inner chamber, the sleeve member having a first open end region and a second closed end region, further comprising securing the first open end region directly or indirectly in fluid tight relation with the leading edge region so that an interior of the sleeve member is in fluid communication with the inner chamber, the step of pressurizing the sleeve member including the pressurizing the inner chamber.

A method as defined, further comprising installing or engaging a coupling ring portion with the side wall portion near the leading edge region.

A method as defined, further comprising locating the first open end region of the sleeve member between the leading edge region and the coupling ring portion.

A method as defined, further comprising pinching and/or otherwise holding the sleeve member between the leading edge region and the coupling ring portion.

A method as defined, further comprising attaching the sleeve member to the coupling ring portion.

A method as defined, further comprising removably locking the coupling ring portion with the side wall portion.

A method as defined, further comprising arranging the sleeve member in its first retracted position to form a nested body, and arranging the nested body and the inner chamber to form at least one channel for pressurized fluid from the inner chamber to be directed to a region adjacent the nested body near the coupling ring portion to deploy the leading segment of the sleeve member from the nested body.

A method as defined, further comprising providing a first strap portion on one side of the second closed end region and interior to the sleeve member in a fully deployed configuration and a second strap portion on an opposite side of the second closed end region and exterior of the sleeve member in the fully deployed configuration.

A method as defined, further comprising coupling a pressurized fluid supply with the inner chamber.

A device for lifting a patient comprising a housing having an inner chamber, the housing having a leading edge region in fluid communication with the inner chamber, the leading edge region being arranged to penetrate an access region between a patient and a support surface beneath the patient, an elongate tubular member having a first open end region and a second closed end region, the open end region being in fluid tight relation with the leading edge region, the elongate tubular member having a first surface in fluid communication with the chamber and an opposite second surface, the housing being arranged to provide a retracted position in which the elongate tubular member is held relative to the leading edge region and responsive to an operative pressure within the chamber to unfurl beyond the leading edge region to cause the elongate tubular member to migrate along the access region with the second surface in contact with the patient and the support surface and with minimal relative motion between the elongate tubular member, the patient and the support surface and toward a deployed position in which the tubular member extends a distance exceeding a lateral dimension of the patient with opposed ends of the tubular member being available to be employed for lifting the patient from the support surface.

A device for lifting a patient, comprising an elongate barrel having an inner surface forming a chamber, the elongate barrel having a first length and a leading edge region, the leading edge region being arranged to penetrate an access region between the patient and a support surface, a sock member having a first open end region and a second closed end region, the open end region being coupled in fluid tight relation with the leading edge region, the sock member having a first surface in fluid communication with the inner surface to seal the chamber and an opposite second surface, the sock member being arranged to extend between a first retracted position along a second length of the inner surface and a second deployed position beyond the barrel, a fluid inlet port to deliver pressurized fluid to the chamber, the sock member being operable under an operative pressure within the chamber to unfurl beyond the leading edge region and to progress along the access region, the sock member being operable to travel between the first retracted position and the second deployed position beyond the elongate barrel and with the first open end region and the second closed end region on opposite sides of the patient.

A device as defined, the first open end region of the sock member being removably attached to the leading edge region of the elongate barrel.

A device as defined, the elongate barrel having a boundary wall opposite the leading edge region, further comprising a tension member operable to extend between the second closed end region of the sock member and the boundary wall.

A device as defined, the boundary wall having a passage therethrough to receive the tension member.

A device as defined, the tension member being removably attachable to the second coupling portion.

A device as defined, the tension member having a free end region to extend beyond the boundary wall, the free end region including a handle formation, the tension member having a length sufficient to extend from the boundary wall through the inner chamber to the second coupling portion when the sock member is in the second deployed position.

A device as defined, the fluid inlet port being located adjacent the boundary wall, further comprising a fitting for engaging a fluid hose therewith.

A device as defined, the sock member being operable to progress along the access region when the chamber is pressurized at a range of 3 to 10 psi.

A device as defined, the sock member being operable to progress along the access region when the chamber is pressurized at pressure not exceeding 4 psi.

A device as defined, further comprising a lifting sleeve member having a third open end region and fourth closed end region, the third open end region being arranged to engage the leading edge region of the elongate barrel and/or the first open end region of the sock member, the lifting sleeve member being dimensioned for the fourth closed end region to be near the second closed end region of the sock member and adjacent the second surface of the sock member when the sock member is in the first retracted position.

A device as defined, each of the third and fourth end regions of the lifting sleeve member further comprising third and fourth coupling portions respectively for coupling with a lifting device.

A device as defined, the lifting sleeve member being arranged to be inside the sock member in the retracted position, the sock member being arranged to be inside the sock member in the second deployed position.

A device as defined, the sock member being retractable from within the lifting sleeve member after the sock member has reached the second deployed position.

A method for lifting an article, comprising providing an elongate sleeve member held in a first retracted position in a pressurized support, pressurizing the sleeve member in a manner to cause it to unfurl from the first retracted position on one side of an article, along an intersection between the article and an adjacent support surface to a second extended position on an opposite side of the article, releasing the sleeve member from the pressurized support, coupling exposed end regions of the sleeve member to a lifting device, and displacing the lifting device to lift the sleeve member.

A device for lifting an article comprising a housing having an inner chamber, the housing having a leading edge region in fluid communication with the inner chamber, the leading edge region being arranged to engage an access region between an article and a support surface beneath the article, at least one primary elongate tubular member having a first open end region and a second closed end region, the first open end region being directly or indirectly in fluid tight relation with the leading edge region, at least one secondary elongate tubular member in fluid communication with the primary elongate tubular member and extending outwardly therefrom, the primary and second elongate tubular members having a first surface in fluid communication with the inner chamber and an opposite second surface, the housing being arranged to provide a retracted position in which the primary and secondary elongate tubular members are held relative to the leading edge region and responsive to an operative pressure within the inner chamber to unfurl beyond the leading edge region to cause the primary and secondary elongate tubular members to migrate along the access region with the second surface in contact with the article and the support surface and with minimal relative motion between the contacting surfaces of the primary and secondary elongate tubular members, the article and the support surface and toward a deployed position in which the primary and/or secondary tubular members extend a distance exceeding a lateral dimension of the article with opposed ends of the primary and/or secondary tubular members being available to be employed for lifting the article from the support surface.

A device as defined, including a plurality of primary or secondary elongate tubular members, two or more of the elongate tubular members being coupled together.

A device as defined, the two or more elongate tubular members having a distal end region, the elongate tubular members being coupled at or near the distal end region.

A method of lifting a patient, comprising:

providing an elongate barrel with an inner surface forming a chamber, a first length and a leading edge region, arranging the leading edge region to penetrate an access region between the patient and a support surface, providing a sock member with a first open end region and a second closed end region, and coupled in fluid tight relation with the leading edge region, the sock member having a first surface in fluid communication with the inner surface to seal the chamber and an opposite second surface, pressurizing the chamber to unfurl the sock beyond the leading edge region and to progress along the access region, the sock member being operable to travel between the first retracted position and a second deployed position beyond the elongate barrel and with the first open end region and the second closed end region on opposite sides of the patient.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for lifting a patient, comprising providing an elongate sleeve member held in a first retracted position in a pressurized support;

the pressurized support including a housing having a side wall defining an inner chamber and a leading edge region in fluid communication with the inner chamber;

a sleeve member having a first open end region and a second closed end region wherein the first open end region is secured in a fluid tight relation with the leading edge region by way of installing or engaging a coupling ring portion with the side wall portion near the leading edge region and attaching the sleeve member to the coupling ring portion;

removably locking the coupling ring portion with the side wall portion so that an interior of the sleeve member is in fluid communication with the inner chamber;

the sleeve member having a first strap portion on one side of the second closed end region and interior to the sleeve member which is accessible in a fully deployed configuration and a second strap portion on an opposite side of the second closed end region and exterior of the sleeve member in the fully deployed configuration;

arranging the sleeve member in the first retracted position to form a nested body, and arranging the nested body and the inner chamber to form at least one channel for directing pressurized fluid from the inner chamber to a region adjacent the nested body near the coupling ring portion so as to deploy a leading segment of the sleeve member from the nested body;

pressurizing the inner chamber so as to cause the sleeve member to unfurl from the first retracted position on one side of a patient, along an intersection between the patient and an adjacent support surface to a second extended position wherein the leading segment is accessible on an opposite side of the patient in the fully deployed configuration;

releasing the sleeve member from the pressurized support;

coupling the first and second strap portions to a lifting device; and displacing the lifting device so as to lift the patient.

2. A method as defined in claim 1, further comprising coupling a pressurized fluid supply with the inner chamber.

* * * * *